US011512633B2

United States Patent
Howell et al.

(10) Patent No.: US 11,512,633 B2
(45) Date of Patent: Nov. 29, 2022

(54) TURBOCHARGER, VIBRATION DETECTION ASSEMBLY, AND METHOD OF USING SAME

(71) Applicant: BorgWarner Inc., Auburn Hills, MI (US)

(72) Inventors: Ryan Howell, Hendersonville, NC (US); Brian Handlon, Arden, NC (US); Paul Diemer, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 538 days.

(21) Appl. No.: 16/604,189

(22) PCT Filed: Apr. 10, 2018

(86) PCT No.: PCT/US2018/026829
§ 371 (c)(1),
(2) Date: Oct. 10, 2019

(87) PCT Pub. No.: WO2018/191225
PCT Pub. Date: Oct. 18, 2018

(65) Prior Publication Data
US 2020/0032706 A1 Jan. 30, 2020

Related U.S. Application Data

(60) Provisional application No. 62/484,226, filed on Apr. 11, 2017.

(51) Int. Cl.
*F02C 6/12* (2006.01)
*F01D 17/10* (2006.01)

(52) U.S. Cl.
CPC .............. *F02C 6/12* (2013.01); *F01D 17/105* (2013.01); *F05D 2220/40* (2013.01);
(Continued)

(58) Field of Classification Search
CPC ...... F02C 6/12; F01D 17/105; F05D 2220/40; F05D 2260/80; F05D 2270/304;
(Continued)

(56) References Cited

U.S. PATENT DOCUMENTS 4,453,407 A * 6/1984 Sato ....................... G01H 1/003
702/56
4,573,358 A * 3/1986 Luongo .................. G01H 1/006
73/660

(Continued)

FOREIGN PATENT DOCUMENTS

DE    102007052453 B4    4/2013
EP        1867850 A1    12/2007
(Continued)

OTHER PUBLICATIONS

International Search Report for Application No. PCT/US2018/026829 dated Jul. 27, 2018, 2 pages.
(Continued)

*Primary Examiner* — J. Todd Newton
(74) *Attorney, Agent, or Firm* — Howard & Howard Attorneys PLLC

(57) ABSTRACT

A turbocharger is used within a vehicle and includes an electronic actuator assembly. The electronic actuator assembly includes an actuator housing coupled to at least one of the turbine housing, the compressor housing, and the bearing housing, and an accelerometer coupled to the actuator housing. The accelerometer is adapted to detect vibration of at least one of the turbine housing, the compressor housing, the bearing housing, and the actuator housing thereby obtaining acceleration data of at least one of the turbine housing, the compressor housing, the bearing housing, and the actuator housing to determine rotational speed of the turbocharger shaft. Another embodiment includes a vibration detection assembly having an accelerometer coupled to a vehicle
(Continued)

component and the vehicle component is one or more of a turbocharger, a valve assembly, an electronically driven compressor, and a turbocharger having an integral electric motor.

15 Claims, 29 Drawing Sheets

(52) U.S. Cl.
CPC .... *F05D 2260/80* (2013.01); *F05D 2270/304* (2013.01); *F05D 2270/334* (2013.01); *F05D 2270/807* (2013.01)

(58) Field of Classification Search
CPC ......... F05D 2270/334; F05D 2270/807; F02B 37/00; F02B 39/16
USPC .......................................................... 702/33
See application file for complete search history.

(56) References Cited

U.S. PATENT DOCUMENTS

| | | | | |
|---|---|---|---|---|
| 4,887,468 | A * | 12/1989 | McKendree | G01H 1/006 73/660 |
| 4,953,110 | A * | 8/1990 | Chartrand | F02B 37/24 60/602 |
| 5,206,816 | A * | 4/1993 | Hill | G01H 1/006 702/56 |
| 5,396,973 | A * | 3/1995 | Schwemmer | F16F 9/38 188/266.2 |
| 5,479,825 | A * | 1/1996 | Williams | G01N 29/07 73/644 |
| 6,298,728 | B1 | 10/2001 | Fekete et al. | |
| 7,912,620 | B2 | 3/2011 | French et al. | |
| 8,109,089 | B2 * | 2/2012 | Gilch | F02C 9/20 60/602 |
| 2004/0011340 | A1* | 1/2004 | Hosny | F16F 15/02 123/559.1 |
| 2004/0216457 | A1 | 11/2004 | Shea et al. | |
| 2007/0016385 | A1* | 1/2007 | Barila | G01P 3/44 702/142 |
| 2009/0204310 | A1* | 8/2009 | Gittere | G07C 5/008 701/101 |
| 2010/0023369 | A1* | 1/2010 | Chapman | G06Q 10/04 703/2 |
| 2010/0292937 | A1 | 11/2010 | Hosny et al. | |
| 2012/0022762 | A1* | 1/2012 | Rosero | F02B 77/08 701/101 |
| 2014/0107905 | A1 | 4/2014 | Kassner | |
| 2015/0033774 | A1 | 2/2015 | Ferreira et al. | |
| 2015/0211951 | A1* | 7/2015 | Willis | G06K 19/07798 73/487 |
| 2020/0105072 | A1* | 4/2020 | Wisley | G07C 5/0808 |

FOREIGN PATENT DOCUMENTS

| | | |
|---|---|---|
| EP | 2392803 B1 | 8/2015 |
| EP | 3043051 A1 | 7/2016 |
| WO | 201146048 A1 | 4/2011 |

OTHER PUBLICATIONS

English language abstract and machine-assisted English translation for DE 10 2007 052 453 extracted from espacenet.com database on Oct. 21, 2019, 17 pages.

Explain That Stuff, "Accelerometers", downloaded from http://www.explainthatstuff.com/accelerometers.html on Jan. 19, 2017, 12 pages.

* cited by examiner

TURBOCHARGER, VIBRATION DETECTION ASSEMBLY, AND METHOD OF USING SAME

CROSS-REFERENCE TO RELATED APPLICATIONS

The present application is the National Stage of International Patent Application No. PCT/US2018/026829 filed on Apr. 10, 2018, which claims priority to and all the benefits of U.S. Provisional Patent Application No. 62/484,226 filed on Apr. 11, 2017, which are hereby expressly incorporated herein by reference in their entirety.

BACKGROUND OF THE INVENTION

1. Field of the Invention

The invention generally relates to an electronic actuator assembly for use with a turbocharger of a vehicle and also to a vibration detection assembly for use in a vehicle having an internal combustion engine.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet be able to develop the same or similar amount of horsepower as larger, naturally aspirated internal combustion engines. Having a smaller internal combustion engine for use with a vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior, a turbine wheel disposed within the turbine housing interior for receiving the exhaust gas from the internal combustion engine, and a turbocharger shaft coupled to and rotatable by the turbine wheel. Typical turbochargers also include a compressor housing defining a compressor housing interior, and a compressor wheel disposed within the compressor housing interior and coupled to the turbocharger shaft, with the compressor wheel being rotatable by the turbocharger shaft for delivering compressed air to the internal combustion engine. Specifically, energy from exhaust gas from the internal combustion engine, which would normally be wasted energy, is used to drive the turbine wheel, which is used to drive the turbocharger shaft and, in turn, the compressor wheel to the deliver the compressed air to the internal combustion engine.

Typical turbochargers also include various electronic actuator assemblies, which are used to control various components of a turbocharger, such as a wastegate valve, a bypass valve, or a variable turbine geometry (VTG) valve. Typical turbochargers further include various electronics, which are commonly used to perform diagnostics on the turbocharger or to control various functions of the turbocharger. However, the electronics and the electronic actuator assemblies of typical turbochargers are usually separate components. This results in more components for the turbocharger, which ultimately results in a more expensive and larger turbocharger.

Additionally, typical turbochargers may have a method of determining rotational speed of the turbocharger shaft, and a method of analyzing acceleration data for performing diagnostics on the turbocharger. However, the electronics and the electronic actuator assemblies of typical turbochargers are expensive and result in a larger turbocharger.

As such, there remains a need to provide for a turbocharger having an improved electronic actuator assembly and improved methods of using the turbocharger.

SUMMARY OF THE INVENTION AND ADVANTAGES

A turbocharger is used with a vehicle for receiving exhaust gas from an internal combustion engine and for delivering compressed air to the internal combustion engine. The turbocharger includes a turbine housing defining a turbine housing interior, a turbine wheel disposed within the turbine housing interior for receiving the exhaust gas from the internal combustion engine, and a turbocharger shaft coupled to and rotatable by the turbine wheel. The turbocharger also includes a compressor housing defining a compressor housing interior, and a compressor wheel disposed within the compressor housing interior and coupled to the turbocharger shaft, with the compressor wheel being rotatable by the turbocharger shaft for delivering compressed air to the internal combustion engine. The turbocharger additionally includes a bearing housing coupled to and disposed between the turbine housing and the compressor housing, with the bearing housing defining a bearing housing interior, and with the turbocharger shaft disposed within the bearing housing interior. The turbocharger further includes an electronic actuator assembly. The electronic actuator assembly includes an actuator housing coupled to at least one of the turbine housing, the compressor housing, and the bearing housing. The electronic actuator assembly also includes an accelerometer coupled to the actuator housing. The accelerometer is adapted to detect vibration of at least one of the turbine housing, the compressor housing, the bearing housing, and the actuator housing thereby obtaining acceleration data of at least one of the turbine housing, the compressor housing, the bearing housing, and the actuator housing to determine rotational speed of the turbocharger shaft.

According to another embodiment of the present invention, a vibration detection assembly for use in a vehicle having an internal combustion engine includes a vehicle component. The vehicle component may be selected from the group consisting of a turbocharger, a valve assembly, an electronically driven compressor, a turbocharger having an integral electric motor, or combinations thereof. The vibration detection assembly also includes an electronic control assembly which has an assembly housing coupled to the vehicle component. Moreover, an accelerometer is coupled to the assembly housing. The accelerometer is adapted to detect vibration of the vehicle component thereby obtaining acceleration data of the vehicle component to perform diagnostics of at least one of the vehicle component, the internal combustion engine, or the vehicle.

Additionally, the present invention further provides for a method of determining rotational speed of a turbocharger shaft of a turbocharger, and a method of analyzing acceleration data of a turbocharger of an internal combustion engine of a vehicle to perform diagnostics of one of the turbocharger, the internal combustion engine, and the vehicle. Accordingly, the electronic actuator assembly of the turbocharger adds the accelerometer to the electronic actuator assembly, which results in a less expensive and smaller turbocharger. Additionally, the method of determining rotational speed of the turbocharger shaft utilizing the electronic actuator assembly using fewer components is more cost effective than how typical turbochargers determine the rotational speed of the turbocharger shaft. Furthermore, the method for analyzing acceleration data for performing diagnostics on the turbocharger using the electronic actuator assembly is more cost effective than typical turbochargers analyzing acceleration data, as typical turbochargers use additional components.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
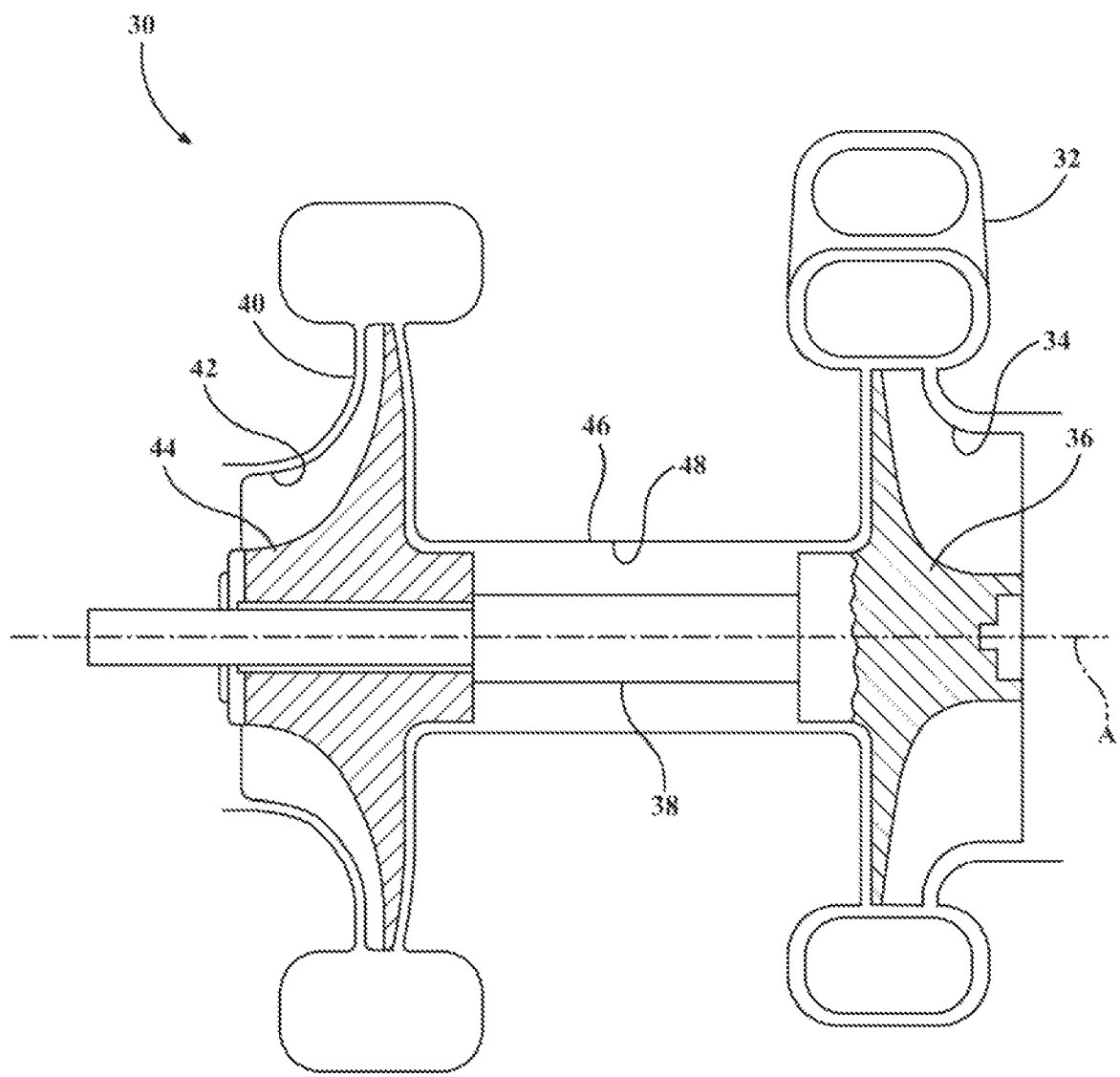
FIG. 1 is a schematic illustration of a turbocharger including a turbine housing defining a turbine housing interior, a turbine wheel disposed within the turbine housing interior, a shaft coupled to and rotatable by the turbine wheel, a compressor housing defining a compressor housing interior, and a compressor wheel disposed within the compressor housing interior and coupled to the shaft.
Figure 5:
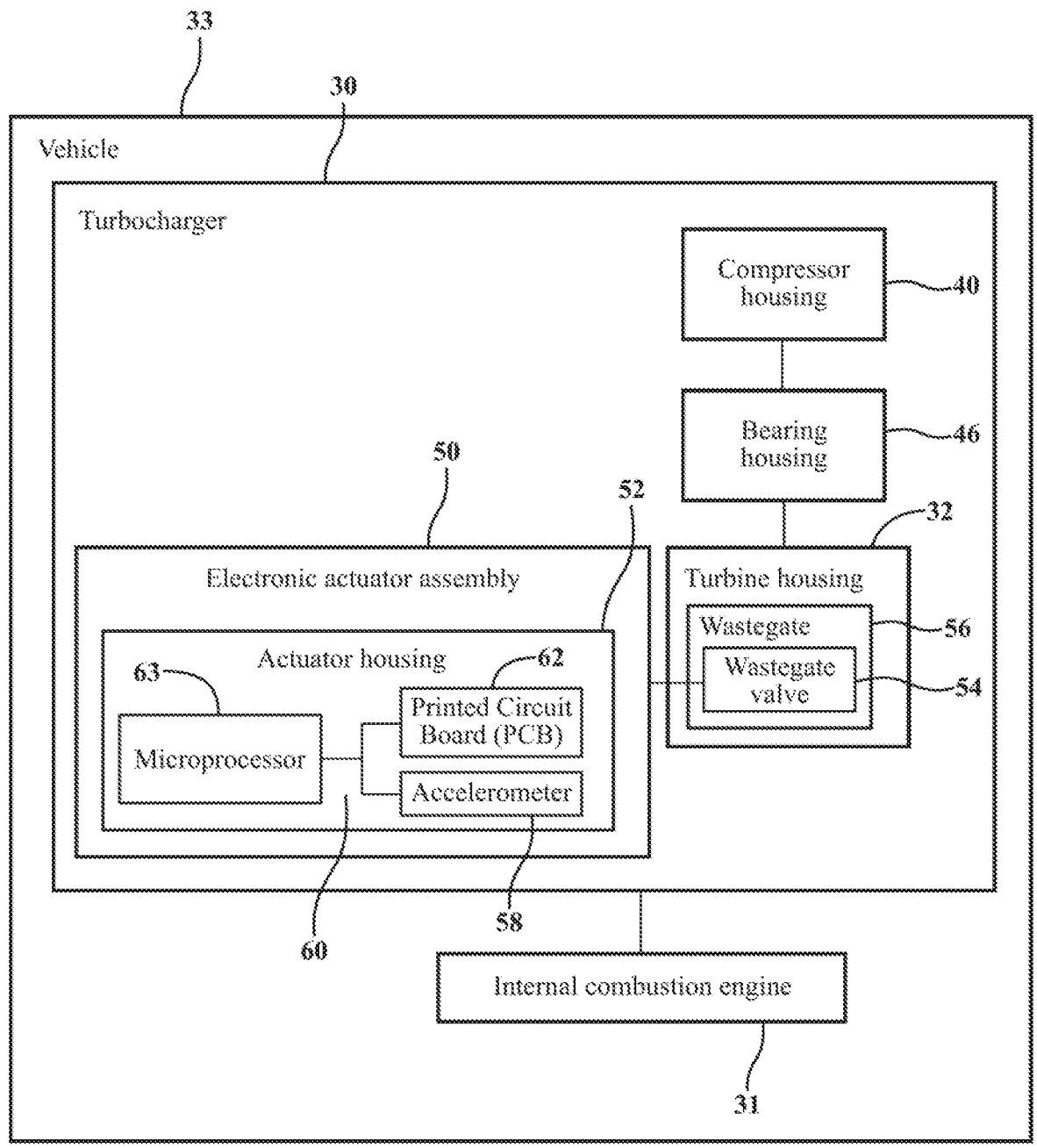
FIG. 5 is a schematic illustration of a vehicle, an internal combustion engine, and the turbocharger, with the turbocharger including a wastegate valve, with said turbine housing defining a wastegate and the wastegate valve being disposed within the wastegate, and with the electronic actuator assembly being further defined as a wastegate actuator for actuating the wastegate valve.

With reference to the Figures, wherein like numerals indicate like parts throughout the several views, a turbocharger 30 is generally shown in FIG. 1. With reference to FIGS. 5-6B, the turbocharger 30 receives exhaust gas from an internal combustion engine 31 of a vehicle 33 and delivers compressed air to the internal combustion engine 31. Referring back to FIG. 1, the turbocharger 30 includes a turbine housing 32 defining a turbine housing interior 34. The turbine housing 32 receives and directs exhaust gas from the internal combustion engine 31. The turbocharger 30 includes a turbine wheel 36 within the turbine housing interior 34 for receiving the exhaust gas from the internal combustion engine 31. Specifically, the exhaust gas from the internal combustion engine 31 is used to drive the turbine wheel 36. The turbocharger 30 includes a turbocharger shaft 38 coupled to and rotatable by the turbine wheel 36. Specifically, the turbine wheel 36 is driven by the exhaust gas from the internal combustion engine 31, which, in turn, rotates the turbocharger shaft 38. The turbocharger shaft 38 typically defines and is rotatable about longitudinal axis A.

The turbocharger 30 includes a compressor housing 40 defining a compressor housing interior 42. The compressor housing interior 42 receives and directs air to the internal combustion engine 31. The turbocharger 30 includes a compressor wheel 44 disposed within the compressor housing interior 42 and coupled to the turbocharger shaft 38. The compressor wheel 36 is rotatable by the turbocharger shaft 38 for delivering the compressed air to the internal combustion engine 31. The turbocharger 30 includes a bearing housing 46 coupled to and disposed between the turbine housing 32 and the compressor housing 40. The bearing housing 46 defines a bearing housing interior 48. The turbocharger shaft 38 is disposed within the bearing housing interior 48.

Figure 2:
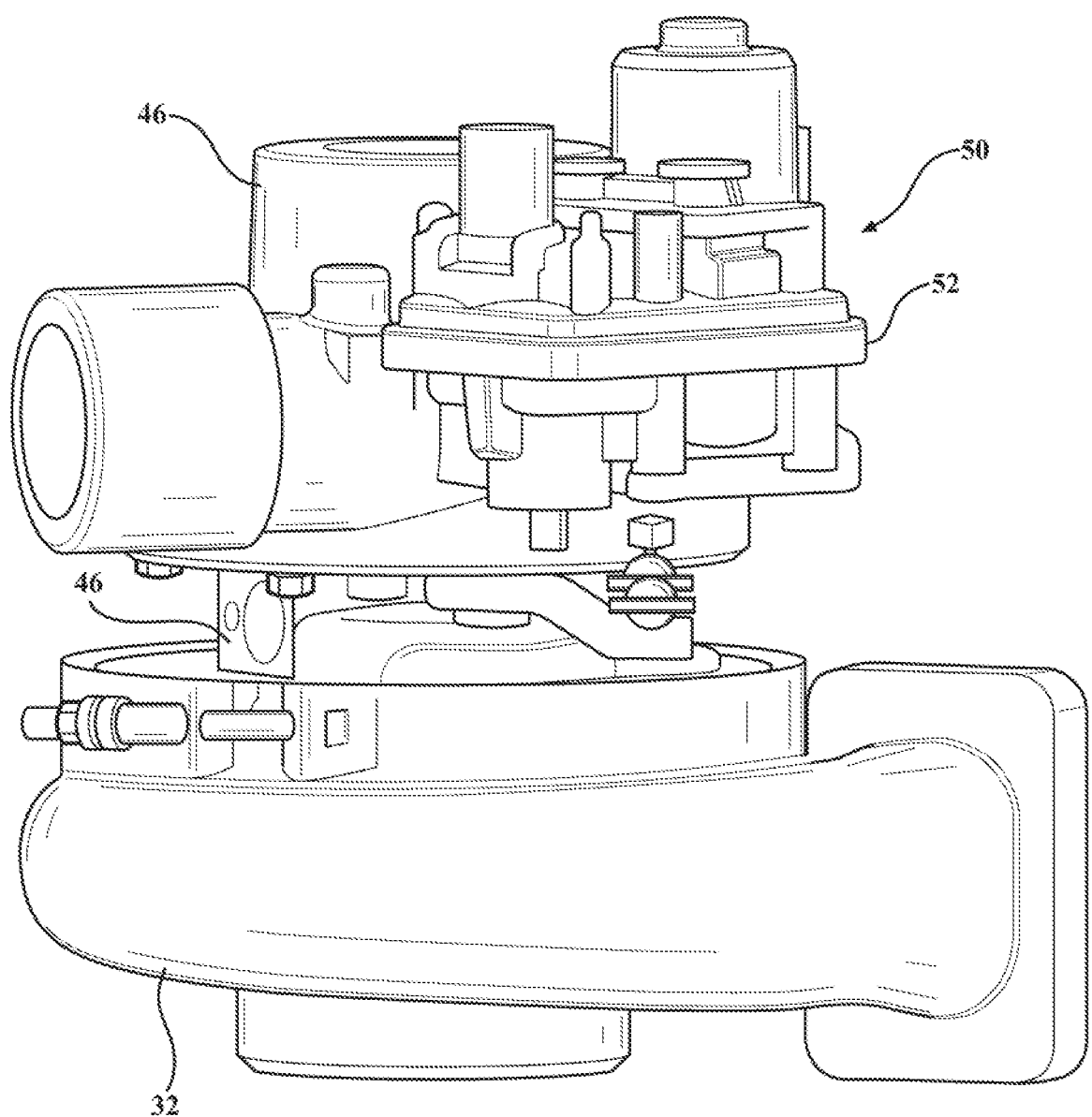
FIG. 2 is a perspective view of the turbocharger including an electronic actuator assembly, with the electronic actuator assembly coupled to the compressor housing.
Figure 3:
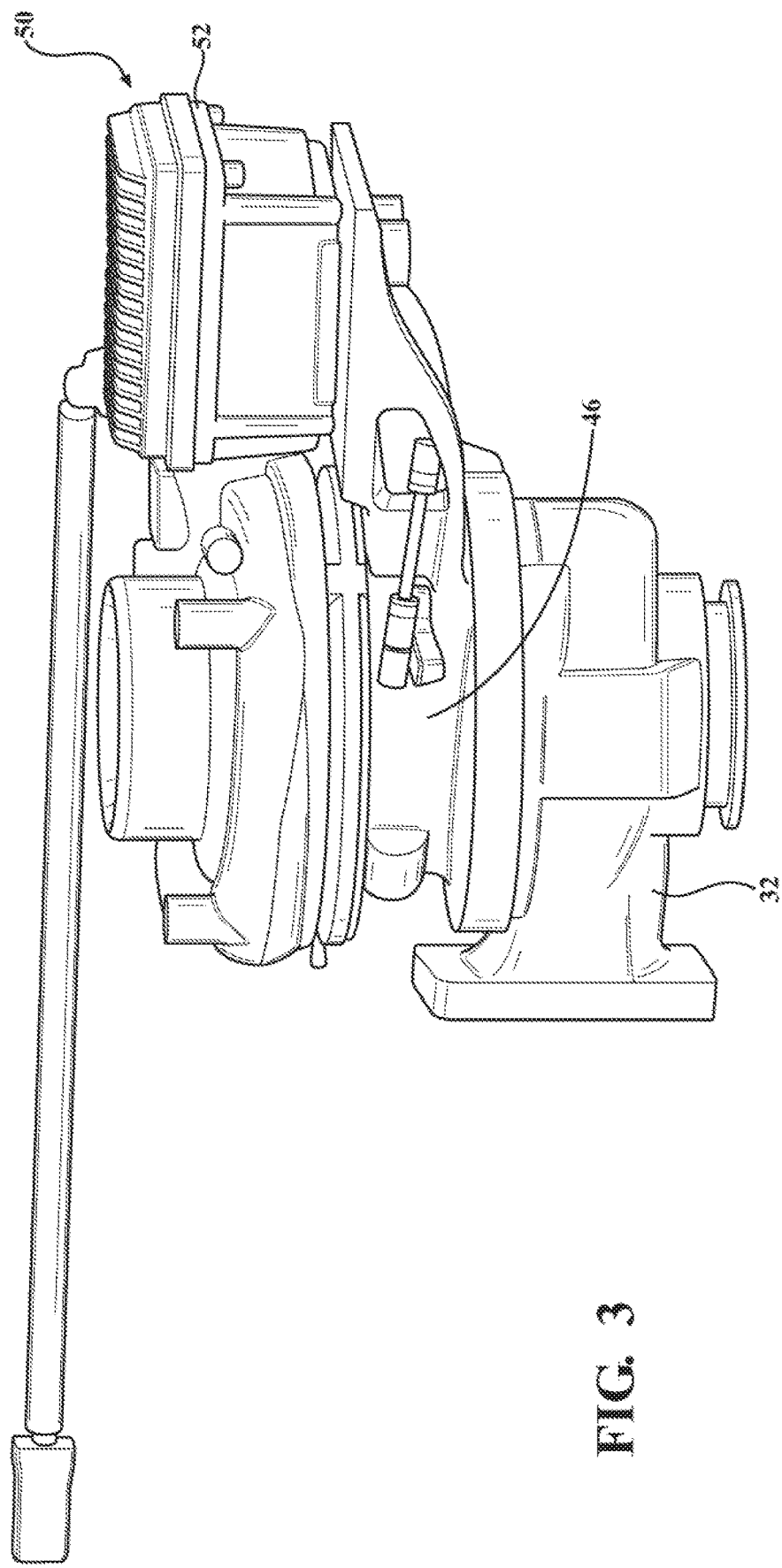
FIG. 3 is a perspective view of the turbocharger, with the electronic actuator assembly coupled to the bearing housing.
Figure 4:
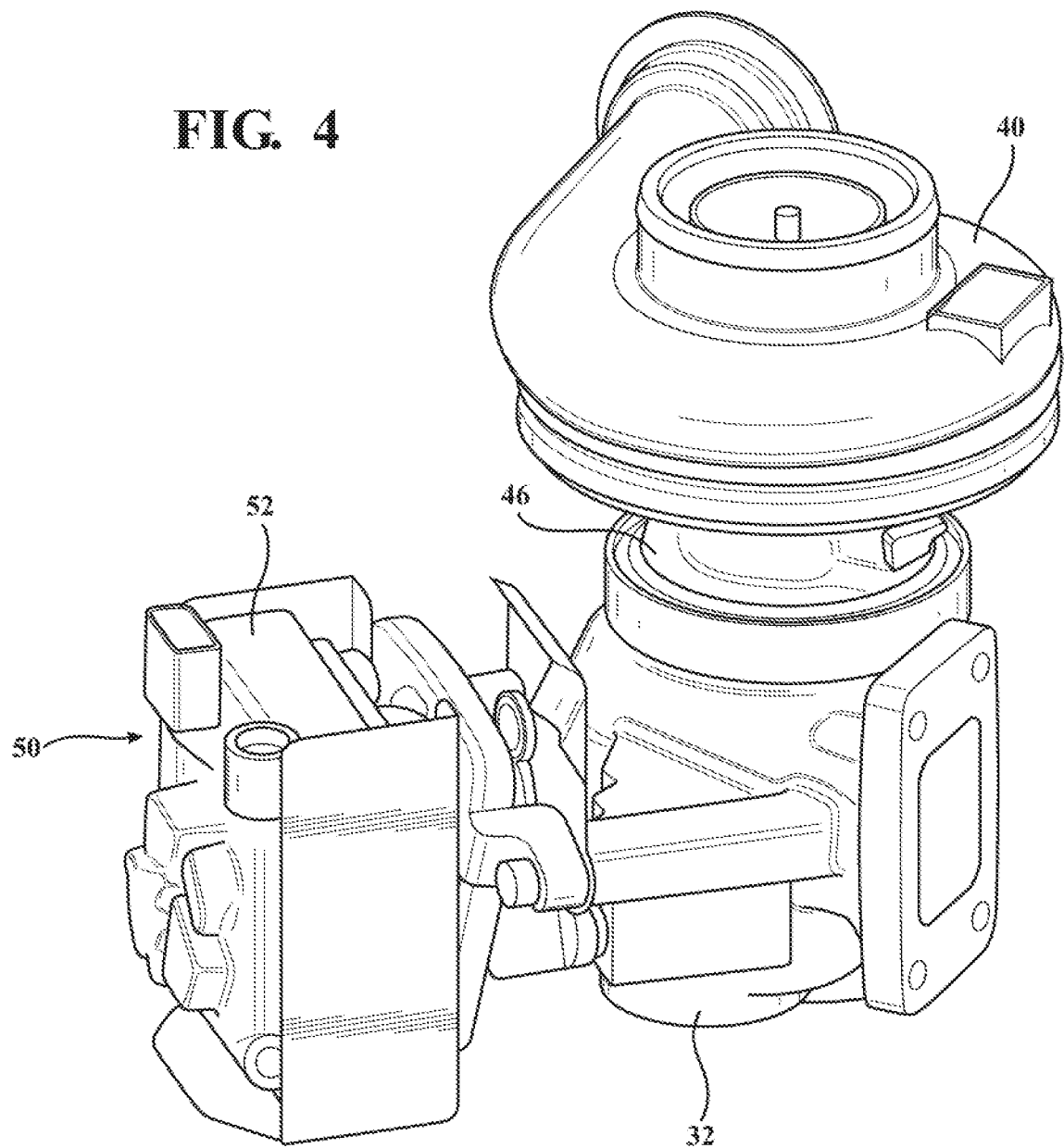
FIG. 4 is a perspective view of the turbocharger, with the electronic actuator assembly coupled to the turbine housing.

With reference to FIGS. 2-6B, the turbocharger 30 includes an electronic actuator assembly 50. The electronic actuator assembly 50 includes an actuator housing 52 coupled to at least one of the turbine housing 32, the compressor housing 40, and the bearing housing 46. In one embodiment, as shown in FIG. 2, the actuator housing 52 is coupled to the compressor housing 40. In another embodiment, as shown in FIG. 3, the actuator housing 52 is coupled to the bearing housing 46. In yet another embodiment, as shown in FIG. 4, the actuator housing 52 is coupled to the turbine housing 32. The electronic actuator assembly 50 is typically used to actuate various components of the turbocharger 30. For example, as illustrated in FIG. 5, the turbocharger 30 may include a wastegate valve 54 and the turbine housing 32 may define a wastegate 56 with the wastegate valve 54 disposed within the wastegate 56. The electronic actuator assembly 50 may be further defined as a wastegate actuator for actuating the wastegate valve 54. In other embodiments, the electronic actuator assembly 50 is used to control a variable turbine geometry (VTG) valve or a bypass valve.

During operation of the turbocharger 30, the turbine housing 32, the compressor housing 40, and the bearing housing 46 vibrate. The electronic actuator assembly 50 includes an accelerometer 58 coupled to the actuator housing 52. Having the accelerometer 58 coupled to the actuator housing 52 allows the accelerometer 58 to detect vibration as seen by the actuator housing 52. In other words, having the accelerometer 58 coupled to the actuator housing 52 allows the accelerometer 58 to move in conjunction with the actuator housing 52 such that the accelerometer 58 detects vibration realized by the actuator housing 52 moving with one of the turbine housing 32, the compressor housing 40, and the bearing housing 46. The accelerometer 58 may be a capacitive accelerometer, a piezoelectric accelerometer, or any other suitable accelerometer.

The accelerometer 58 is adapted to detect vibration of at least one of the turbine housing 32, the compressor housing 40, the bearing housing 46, and the actuator housing 52, thereby obtaining acceleration data of at least one of the turbine housing 32, the compressor housing 40, the bearing housing 46, and the actuator housing 52 to determine rotational speed of the turbocharger shaft 38. Specifically, in one embodiment, the accelerometer 58 is adapted to detect vibration of the actuator housing 52 because the accelerometer 58 is coupled to the actuator housing 52 and moves in conjunction with the actuator housing 52 as the actuator housing 52 vibrates. In another embodiment, the accelerometer 58 is adapted to detect vibration of at least one of the turbine housing 32, the compressor housing 40, and the bearing housing 46 because the actuator housing 52 and, in turn, the accelerometer 58 move in conjunction with at least one of the turbine housing 32, the compressor housing 40, the bearing housing 46. For example, if the actuator housing 52 is coupled to the turbine housing 32, the actuator housing 52 and, in turn, the accelerometer 58 move in conjunction with the turbine housing 32 such that the accelerometer 58 detects vibration realized by the turbine housing 32. As another example, if the actuator housing 52 is coupled to the compressor housing 40, the actuator housing 52 and, in turn, the accelerometer 58 move in conjunction with the compressor housing 40 such that the accelerometer 58 detects vibration realized by the compressor housing 40. As a further example, if the actuator housing 52 is coupled to the bearing housing 46, the actuator housing 52 and, in turn, the accelerometer 58 move in conjunction with the bearing housing 46 such that the accelerometer 58 detects vibration realized by the bearing housing 46.

As the accelerometer 58 detects vibration of one of the turbine housing 32, the compressor housing 40, and the bearing housing 46 through detecting vibration of the actuator housing 52, the accelerometer 58 may assist in correlating the acceleration data to determine rotational speed of the turbocharger shaft 38. The acceleration data is compared with standard acceleration data corresponding to a rotational speed of the turbocharger shaft 38 of one of the turbine housing 32, the compressor housing 40, the bearing housing 46, and the actuator housing 52. As the rotational speed of the turbocharger shaft 38 changes, the vibration of the turbine housing 32, the compressor housing 40, the bearing housing 46, and the actuator housing 52 changes, which allows the accelerometer 58 to assist in determining the rotational speed of the turbocharger shaft 38 due to the changing vibration by correlating the acceleration data with the standard acceleration data.

To determine the standard acceleration data, the turbocharger 30 may be tested under controlled operating conditions. For example, during the testing of the turbocharger 30, the rotational speed of the turbocharger shaft 38 is controlled and the corresponding vibration of the turbine housing 32, the compressor housing 40, and the bearing housing 46 is recorded. If the actuator housing 52 is coupled to the turbine housing 32 during the testing of the turbocharger 30, the standard acceleration data of the turbocharger 30 under the tested operating conditions is recorded. If the actuator housing 52 is coupled to the compressor housing 40 during the testing of the turbocharger 30, the standard acceleration data of the turbocharger 30 under the tested operating conditions is recorded. If the actuator housing 52 is coupled to the bearing housing 46 during the testing of the turbocharger 30, the standard acceleration data of the turbocharger 30 under the tested operating conditions is recorded.

It is to be appreciated that the accelerometer 58 may be used during prototype development of the turbocharger 30, and that the accelerometer 58 may be removed from the turbocharger 30 prior to production. For example, the accelerometer 58 may be used on a prototype of the turbocharger 30 to perform acceptance testing on various parameters, such as rotational speed of the turbocharger shaft 38, and that the accelerometer 58 may be removed from before production.

With reference to FIG. 5, the actuator housing 52 may define an actuator housing interior 60. In some embodiments, the turbocharger 30 may include a printed circuit board (PCB) 62 disposed within the actuator housing interior 60. In such embodiments, the accelerometer 58 may be disposed on the PCB 62, or the accelerometer 58 may be coupled to the actuator housing 52 with leads connecting the accelerometer 58 with the PCB 62.

The electronic actuator assembly 50 may include a microprocessor 63, with the microprocessor 63 adapted to receive the acceleration data from the accelerometer 58 to calculate rotational speed of the turbocharger shaft 38. The microprocessor 63 may be disposed within the actuator housing interior 60, and may be disposed on the PCB 62 for communicating with the accelerometer 58. Said differently, the accelerometer 58 and the microprocessor 63 are integrated on the PCB 62. The electronic actuator assembly 50 may also include a memory chip in electrical communication with the accelerometer 58 for providing the electronic actuator assembly 50 with additional memory for storing the acceleration data. The microprocessor 63 may receive the acceleration data from the accelerometer 58 such that the microprocessor 63 correlates the acceleration data with the standard acceleration data.

Figure 6A:
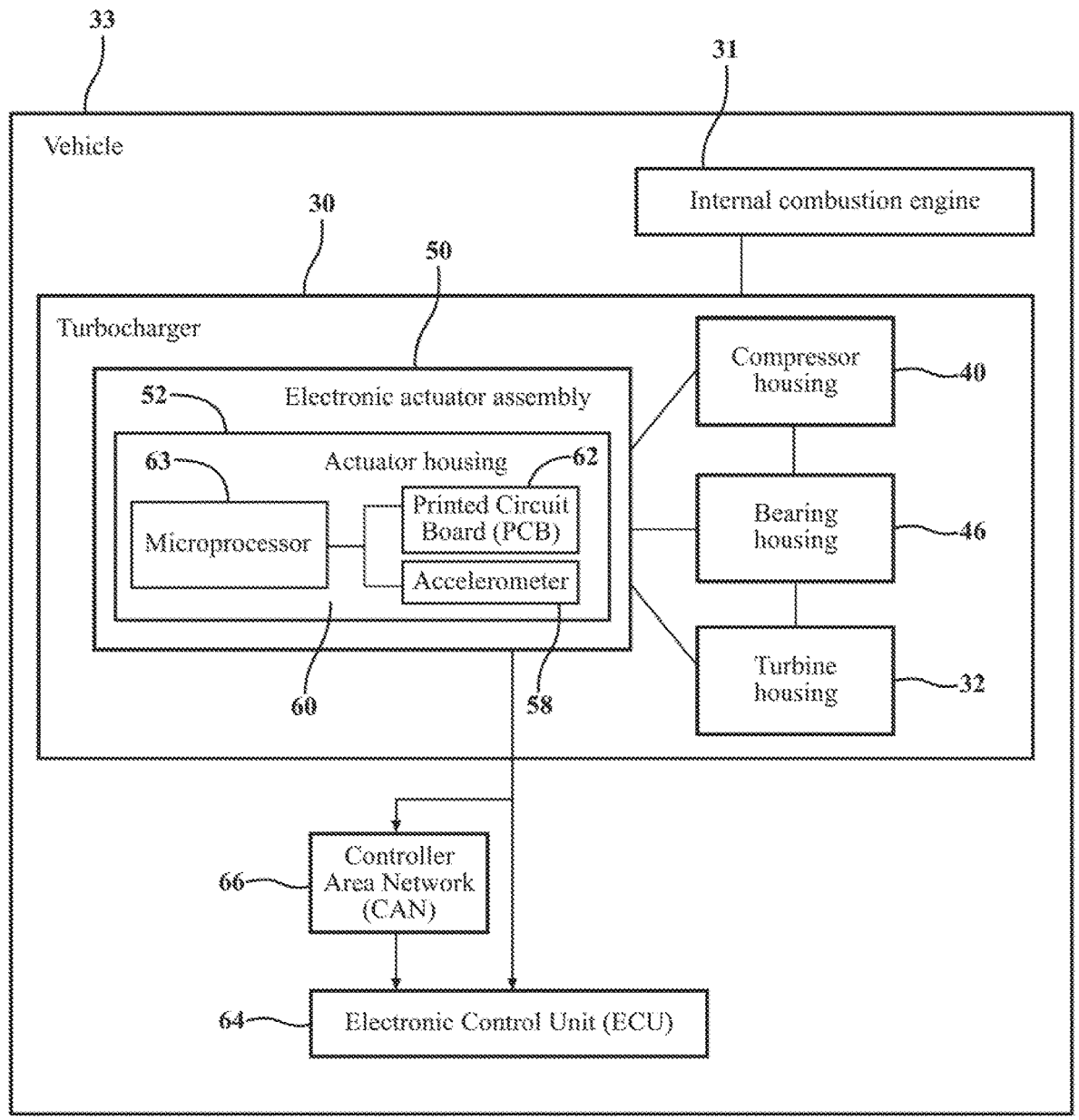
FIG. 6A is a schematic illustration of the vehicle, the internal combustion engine, the turbocharger, and the electronic actuator assembly, with the electronic actuator assembly including an actuator housing, an accelerometer, and a microprocessor adapted to provide an output signal to an Electric Control Unit (ECU) over a Controller Area Network (CAN)
Figure 6B:
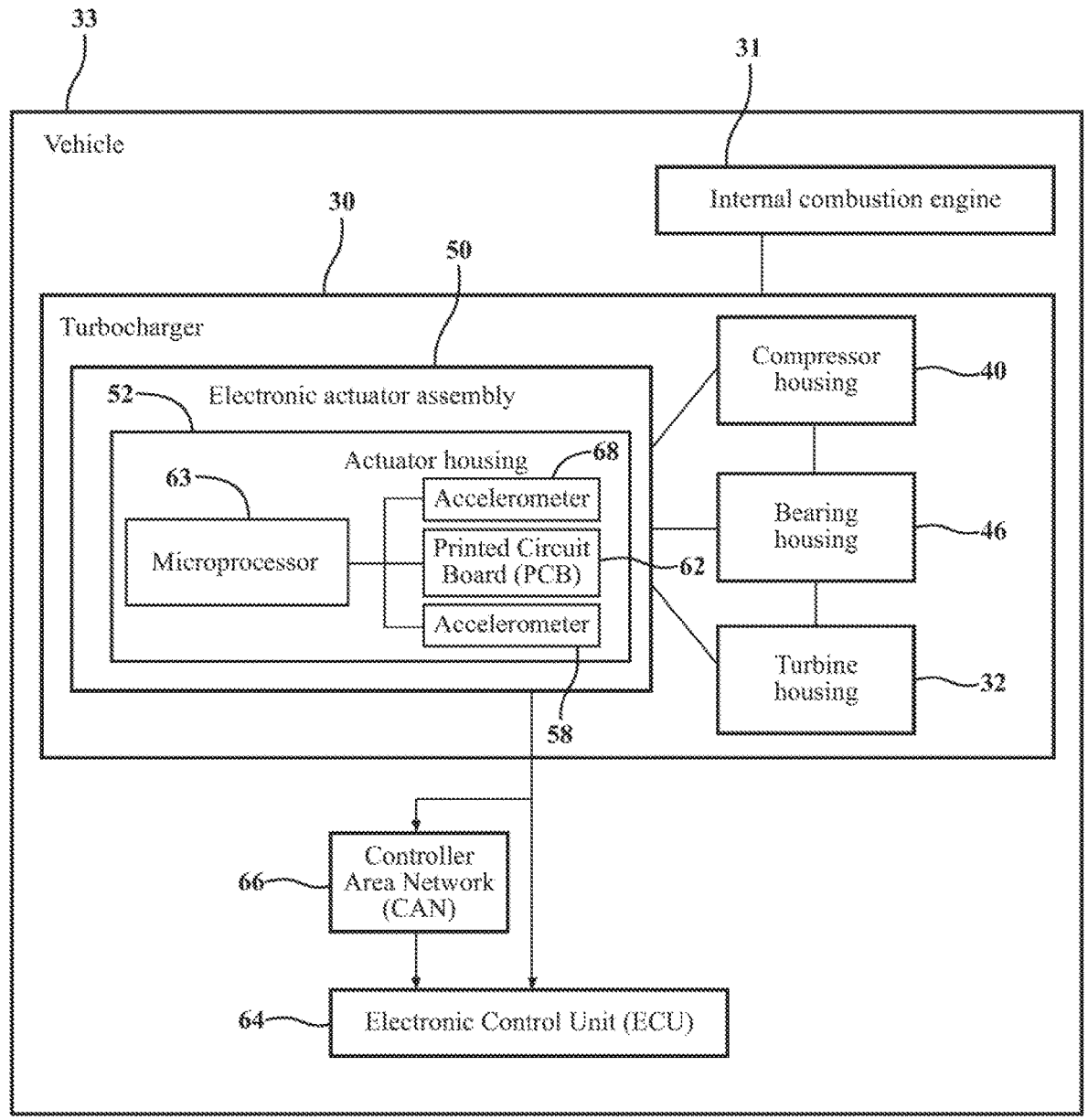
FIG. 6B is a schematic illustration of the vehicle, the internal combustion engine, the turbocharger, and the electronic actuator assembly, with the electronic actuator assembly including the actuator housing, the accelerometer, and a second accelerometer.
Figure 7:
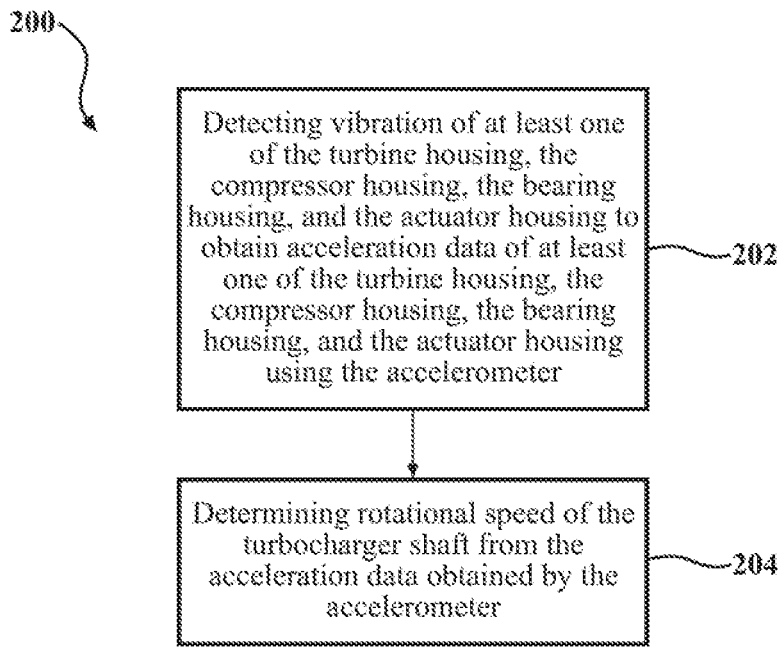
FIG. 7 is a flowchart of a method for determining rotational speed of a turbocharger shaft of a turbocharger of an internal combustion engine.

In one embodiment, the accelerometer 58 is adapted to be connected to an electronic control unit (ECU) 64, as shown in FIG. 6A and as described in further detail below. In this embodiment, the microprocessor 63 may be adapted to be connected with the ECU 64, with the microprocessor 63 adapted to provide the output signal containing the acceleration data to the ECU 64 to determine rotational speed of the turbocharger shaft 38. The ECU 64 may be a component of the electronic actuator assembly 50 such that the microprocessor 63 is directly wired to the ECU 64. In other embodiments, the ECU 64 is a component of the internal combustion engine 31. In other embodiments, the ECU 64 is a component of the vehicle 33. For example, the ECU 64 may be a component of electronics and controls of the vehicle 33.

The microprocessor 63 may be adapted to provide the output signal to the ECU 64 over a Controller Area Network (CAN) 66. Providing the output signal to the ECU 64 over the CAN 66 allows the ECU 64 to receive the output signal without being directly wired to the microprocessor 63. This allows the microprocessor 63 to send the output signal, which typically includes the acceleration data obtained by the accelerometer 58, to the ECU 64 without a direct wire connection and without a host computer. Accordingly, the microprocessor 63 may send the output signal to the ECU 64 at any location in the vehicle 33. It is to be appreciated that the output signal may be sent to the ECU 64 over a Flexray, Local Interconnect Network (LIN), Pulse-Width Modulation (PWM), or Ethernet.

In one embodiment, the turbocharger 30 is free of a speed sensor for determining the rotational speed of the turbocharger shaft 38. In other words, the turbocharger 30 does not include a speed sensor. Typically, in this embodiment, the microprocessor 63 is used to determine rotational speed of the turbocharger shaft 38. Having the turbocharger 30 free of a speed sensor decreases the overall cost of the turbocharger 30, as the accelerometer 58 and microprocessor 63 provide significant cost savings over typical speed sensors. In such embodiments, the accelerometer 58, as described in further detail above, detects vibration of the actuator housing 52 and, in turn, one of the turbine housing 32, compressor housing 40, and bearing housing 46 to obtain the acceleration data and such that the microprocessor 63 correlates the acceleration data with the standard acceleration data to determine rotational speed of the turbocharger shaft 38. Having the accelerometer 58 of the electronic actuator assembly 50 detect vibration helps decrease the overall cost of the turbocharger 30, as the turbocharger 30 does not need additional electronics, mountings, and accelerometers.

The accelerometer 58 may be a two-axis accelerometer. The accelerometer 58 may be a micromechanical systems (MEMS) sensor. An example of a suitable two-axis accelerometer includes, but is not limited to, ST Microelectronic's AIS1200PS accelerometer. The AIS1200PS accelerometer operates between five and 16 volts, has a +/−200 g capability, and is able to operate between −40 to 125 degrees Celsius. Additionally, the AIS1200PS accelerometer is about 6×10 mm and has a 16 pin connection. Due to heat generated by the internal combustion engine 31, the turbocharger 30 and, in turn, the accelerometer 58 are exposed to operating temperatures of the turbocharger 30 caused by exhaust gas from the internal combustion engine 31. Typically, the electronic actuator assembly 50 is subjected to between 110 to 150 degrees Celsius. As such, the accelerometer 58 is typically selected to be able to operate within the operating temperature of the turbocharger 30. It is to be appreciated that any suitable two-axis accelerometer may be used without departing from the nature of the present invention. Using the two-axis accelerometer, whether the two-axis accelerometer is a MEMS sensor, such as the AIS1200PS accelerometer, or another suitable two-axis accelerometer, to detect vibration of at least one of the turbine housing 32, the compressor housing 40, the bearing housing 46, and the actuator housing 52 allows the accelerometer 58 to obtain acceleration data of at least one of the turbine housing 32, the compressor housing 40, the bearing housing 46, and the actuator housing 52 to determine rotational speed of the turbocharger shaft 38, which results in a less expensive turbocharger 30.

In one embodiment, as illustrated in FIG. 6B, the electronic actuator assembly 50 includes a second accelerometer 68. In one embodiment, the second accelerometer 68 is a two-axis accelerometer. In such embodiments, the accelerometer 58 is a two-axis accelerometer, with the accelerometer 58 and the second accelerometer 68 being adapted to detect three-axis vibration. Specifically, the accelerometer 58 and the second accelerometer 68 are adapted to detect three-axis vibration because the accelerometer 58 detects two-axis vibration, for example X and Y axis, and the second two-axis accelerometer 68 detects two-axis vibration, with one the axis being the Z axis. Alternatively, the accelerometer 58 may be a three-axis accelerometer to detect three-axis vibration. In embodiments where the electronic actuator assembly 50 includes the three-axis accelerometer, the electronic actuator assembly 50 may be free of other two-axis accelerometers. In other words, in embodiments where the electronic actuator assembly 50 includes the three-axis accelerometer, the electronic actuator assembly 50 may not include any two-axis accelerometer. In other embodiments, the accelerometer 60 may be a two-axis accelerometer and the second accelerometer 68 may be a single axis accelerometer, with the accelerometer 60 and the second accelerometer 68 adapted to detect three-axis vibration. In yet another embodiment, the electronic actuator assembly 50 may include a third accelerometer, with the third accelerometer, the accelerometer 60, and the second accelerometer 68 all being single-axis accelerometers, and with the third accelerometer, the accelerometer 60, and the second accelerometer 68 adapted to detect three-axis vibration.

With reference to FIGS. 7-13, a method 200 of determining rotational speed of the turbocharger shaft 38 of the turbocharger 30 of the internal combustion engine 31 includes the step of detecting vibration of at least one of the turbine housing 32, the compressor housing 40, the bearing housing 46, and the actuator housing 52 to obtain acceleration data of at least one of the turbine housing 32, the compressor housing 40, the bearing housing 46, and the actuator housing 52 using the accelerometer 58, as indicated by block 202. The method 200 additionally includes the step of determining rotational speed of the turbocharger shaft 38 from the acceleration data obtained by the accelerometer 58, as indicated by block 204.

Figure 8:
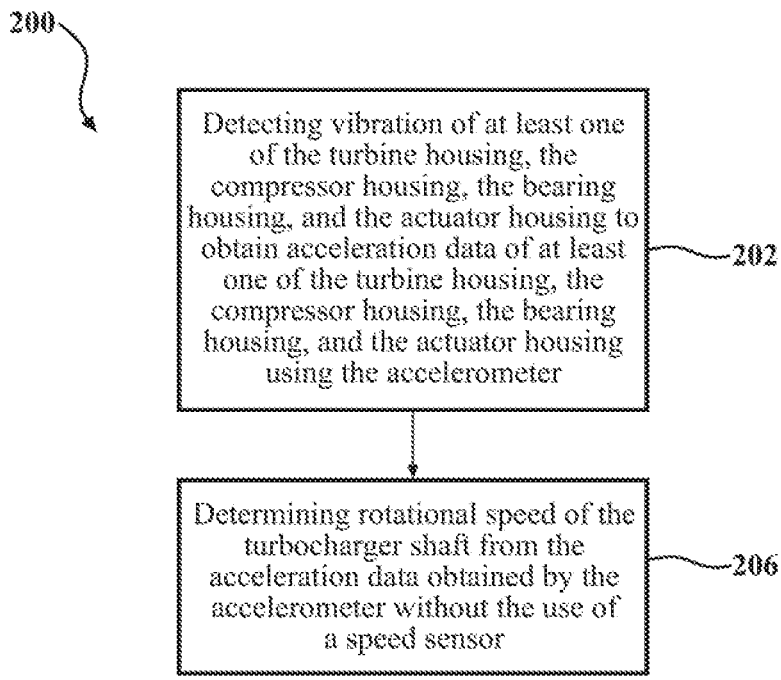
FIG. 8 is a flowchart of the method of FIG. 7, with the step of determining rotational speed of the turbocharger shaft from the acceleration data obtained by the accelerometer being completed without the use of a speed sensor.

As shown in FIG. 8, the step 204 of determining the rotational speed of the turbocharger shaft 38 may be completed without the use of a speed sensor. The step 204 of determining rotational speed of the turbocharger shaft 38 without the use of a speed sensor is advantageous as the rotational speed of the turbocharger shaft 38 is determined by the microprocessor 63, which results in a less expensive turbocharger 30. As described above, determining rotational speed of the turbocharger shaft 38 from the acceleration data obtained by the accelerometer 58 reduces the overall cost of the turbocharger 30, especially when the turbocharger 30 is free of a speed sensor.

Figure 9:
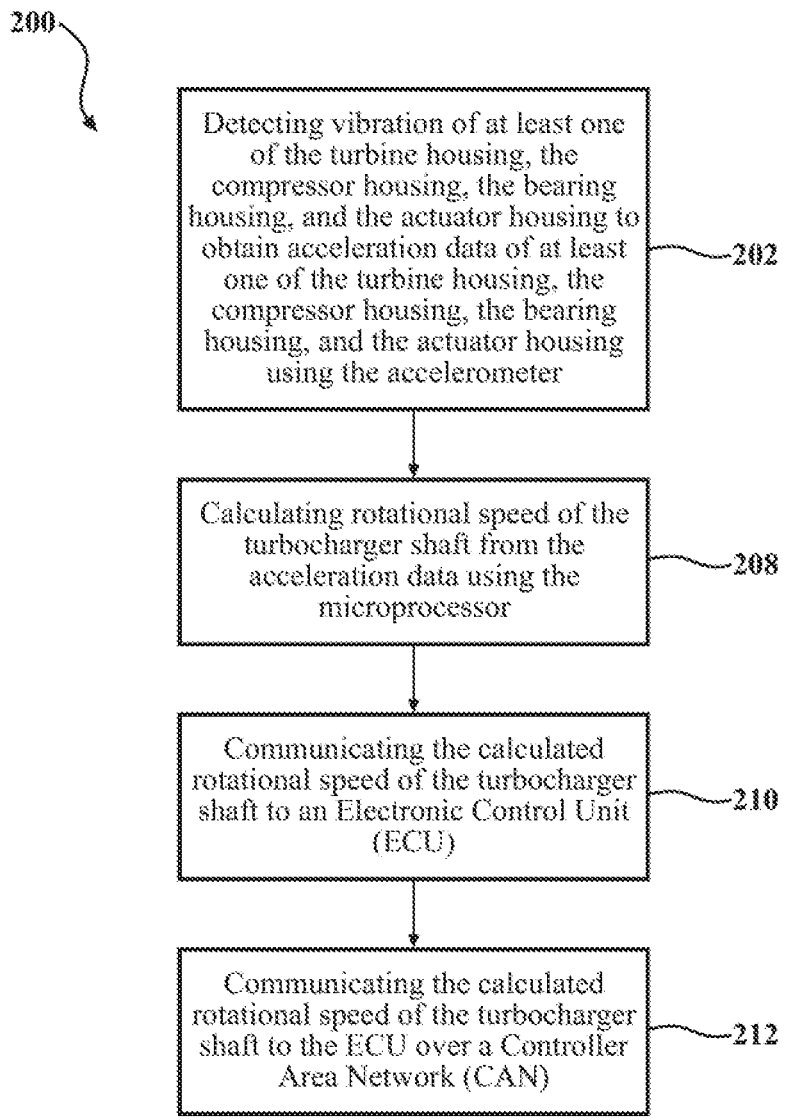
FIG. 9 is a flowchart of the method of FIG. 7, with the step of determining rotational speed of the turbocharger shaft being further defined as calculating rotational speed of the turbocharger shaft from the acceleration data using the microprocessor, and further including the steps of communicating the calculated rotational speed of the turbocharger shaft to the ECU, and communicating the calculated rotational speed of the turbocharger shaft to the ECU over the CAN.

In one embodiment, as shown in FIG. 9, the step 204 of determining rotational speed of the turbocharger shaft 38 is further defined as calculating rotational speed of the turbocharger shaft 38 from the acceleration data using the microprocessor 63, as indicated by block 208. Once the rotational speed of the turbocharger shaft 38 is calculated using the microprocessor 63, the method 200 may further include the step of communicating the calculated rotational speed of the turbocharger shaft 38 to the ECU 64, as indicated by block 210. Communicating the calculated rotational speed of the turbocharger shaft 38 may allow the turbocharger manufacturer to use the ECU 64 already onboard the vehicle 33, without having to add additional algorithms to the ECU 64 already onboard the vehicle 33. In some embodiments, the step 210 of communicating the calculated rotational speed of the turbocharger shaft 38 to the ECU 64 may be done over the CAN 66, as indicated by block 212. As described above, providing the output signal to the ECU 64 over the CAN 66 allows the ECU 64 to receive the output signal without being directly wired to the accelerometer 58 and/or the microprocessor 63. This allows the microprocessor 63 to send the output signal, which typically includes the acceleration data obtained by the accelerometer 58, to the ECU 64 without a direct wire connection and without a host computer. Accordingly, the accelerometer 58 and/or the microprocessor 63 may send the output signal to the ECU 64 at any location in the vehicle 33. It is to be appreciated that the output signal may be sent to the ECU 64 over a Flexray, Local Interconnect Network (LIN), Pulse-Width Modulation (PWM), or Ethernet.

Figure 10:
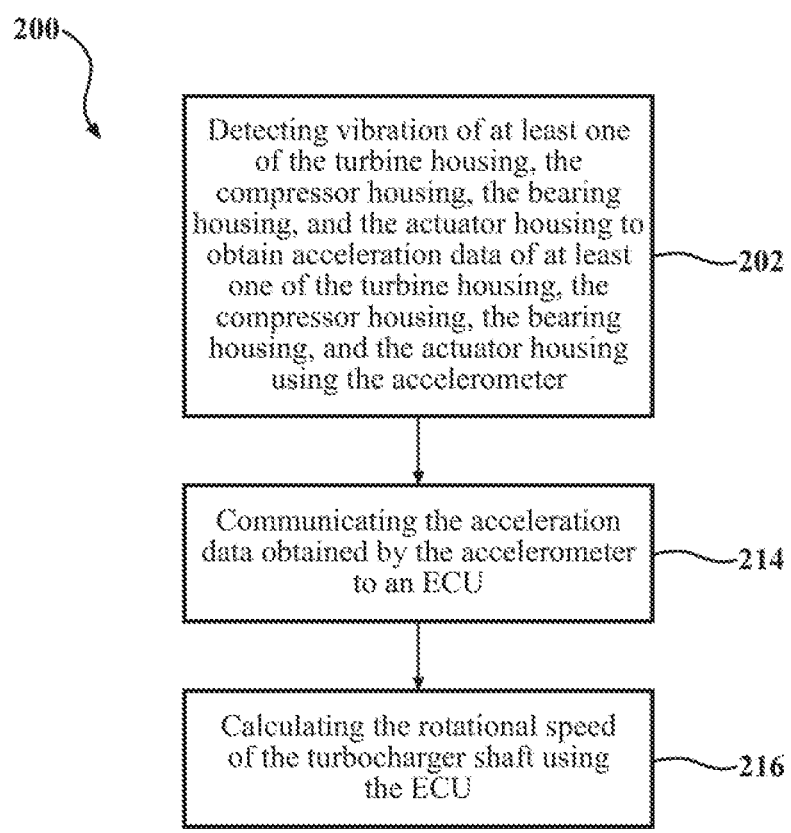
FIG. 10 is a flowchart of the method of FIG. 7, further including the step of communicating the acceleration data obtained by the accelerometer to the ECU, and with the step of determining rotational speed of the turbocharger shaft being further defined as calculating the rotational speed of the turbocharger shaft using the ECU.

The method 200 of determining rotational speed of the turbocharger shaft 38, as shown in FIG. 10, may further include the step of communicating the acceleration data obtained by the accelerometer 58 to the ECU 64, as indicated by block 214. In this embodiment, the step 204 of determining rotational speed of the turbocharger shaft 38 is further defined as calculating the rotational speed of the turbocharger shaft 38 using the ECU 64, as indicated by block 10. In this embodiment, the ECU 64 is used to calculate the rotational speed of the turbocharger shaft 38. Using the ECU 64 to calculate the rotational speed of the turbocharger shaft 38 allows the ECU 64 to receive the acceleration data obtained by the accelerometer 58, which is often raw acceleration data, and calculate the rotational speed of the turbocharger shaft 38. Having the ECU 64 calculate the rotational speed of the turbocharger shaft 38 using the raw acceleration data may remove the need for an additional component to calculate the rotational speed of the turbocharger shaft 38. Typically, the microprocessor 63 communicates the acceleration data obtained by the accelerometer 58 to the ECU 64.

Figure 11:
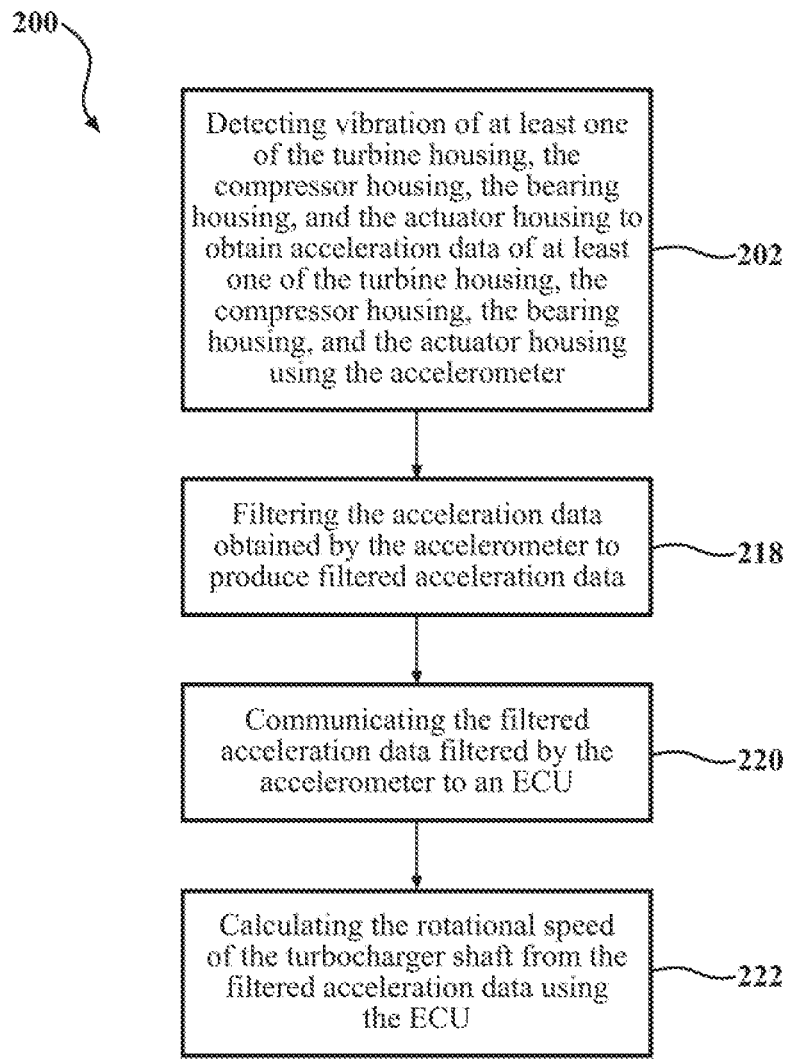
FIG. 11 is a flowchart of the method of FIG. 7, further including the steps of filtering the acceleration data obtained by the accelerometer to produce filtered acceleration data, and communicating the filtered acceleration data filtered by the accelerometer to the ECU, with the step of determining rotational speed of the turbocharger shaft being further defined as calculating the rotational speed of the turbocharger shaft from the filtered acceleration data using the ECU.

The method 200 of determining rotational speed of the turbocharger shaft 38, as shown in FIG. 11, may further include the steps of filtering the acceleration data obtained by the accelerometer 58 to produce filtered acceleration data, as indicated by block 218, and communicating the filtered acceleration data filtered by the accelerometer 58 to the ECU 64, as indicated by block 220. In this embodiment, the step 204 of determining rotational speed of the turbocharger shaft 38 is further defined as calculating the rotational speed of the turbocharger shaft 38 from the filtered acceleration data using the ECU 64, as indicated by block 222. In this embodiment, the step 218 of filtering the acceleration data may be completed using the accelerometer 58 or the microprocessor 63. Filtering the acceleration data to produce the filtered acceleration data and communicating the filtered acceleration data to the ECU 64 allows the ECU 64 to calculate rotational speed of the turbocharger shaft 38 without the need to first filter the acceleration data.

Figure 12:
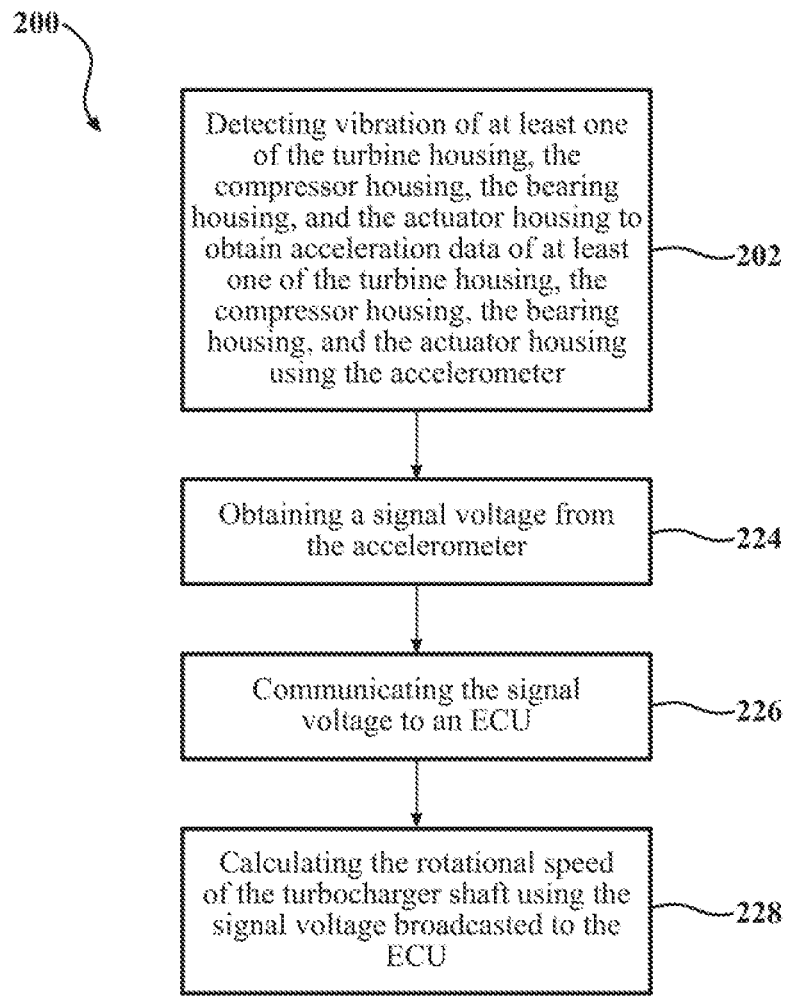
FIG. 12 is a flowchart of the method of FIG. 7, further including the steps of obtaining a signal voltage from the accelerometer, and communicating the signal voltage to the ECU, with the step of determining rotational speed of the turbocharger shaft being further defined as calculating the rotational speed of the turbocharger shaft using the signal voltage communicated to the ECU.

As shown in FIG. 12, the method of determining rotational speed of the turbocharger shaft 38 may further include the steps of obtaining a signal voltage from the accelerometer 58, as indicated by block 224, and communicating the signal voltage to the ECU 64, as indicated by block 226. In this embodiment, the step 204 of determining rotational speed of the turbocharger shaft 38 is further defined as calculating the rotational speed of the turbocharger shaft 38 using the signal voltage communicated to the ECU 64, as indicated by block 228. In this embodiment, the ECU 64 is used to calculate the rotational speed of the turbocharger shaft 38 using the signal voltage. Typically, the signal voltage is communicated to the ECU 64 by the microprocessor 63. Having the ECU 64 calculate the rotational speed of the turbocharger shaft 38 using the signal voltage representing the acceleration data, which is often a raw signal voltage representing the acceleration data, allows the ECU 64 to calculate the rotational speed of the turbocharger shaft 38. Having the ECU 64 calculate the rotational speed of the turbocharger shaft 38 using the raw signal voltage may remove the need for an additional component to calculate the rotational speed of the turbocharger shaft 38.

Figure 13:
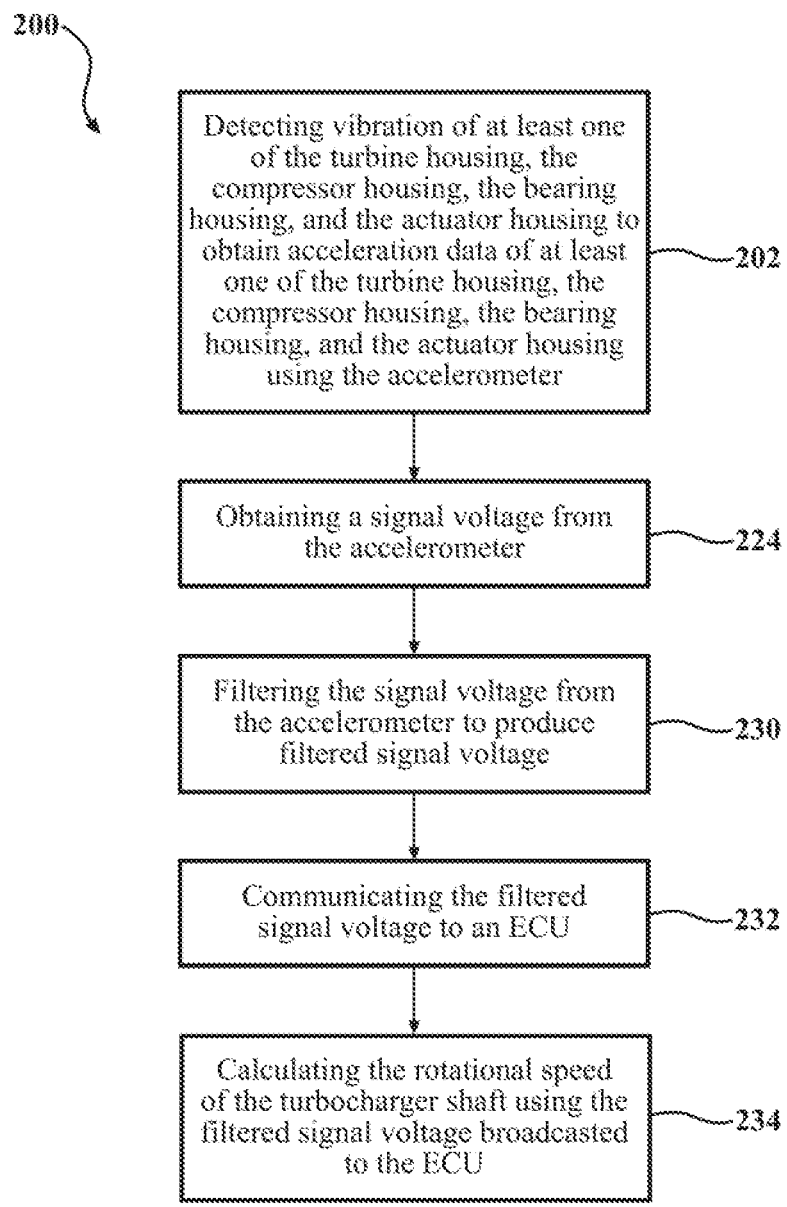
FIG. 13 is a flowchart of the method of FIG. 7, further including the steps of obtaining a signal voltage from the accelerometer, filtering the signal voltage from the accelerometer to produce filtered signal voltage, and communicating the filtered signal voltage to the ECU, with the step of determining rotational speed of the turbocharger shaft being further defined as calculating the rotational speed of the turbocharger shaft using the filtered signal voltage communicated to the ECU.
Figure 14:
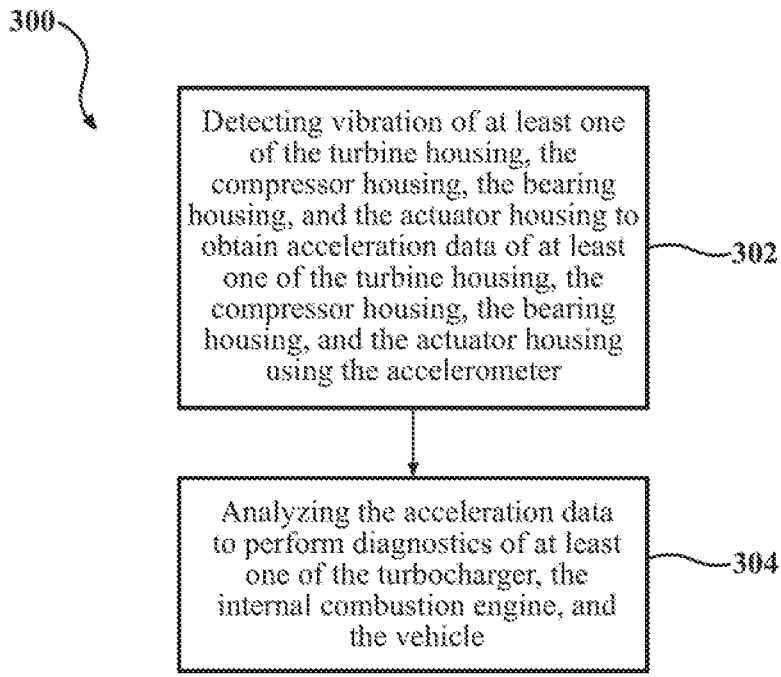
FIG. 14 is a flowchart of a method for analyzing acceleration data of a turbocharger of an internal combustion engine of a vehicle to perform diagnostics of one of the turbocharger, the internal combustion engine, and the vehicle.

In another embodiment, as shown in FIG. 13, the method 200 of determining rotational speed of the turbocharger shaft 38 may further include the steps of obtaining a signal voltage from the accelerometer, as indicated by block 224, filtering the signal voltage from the accelerometer to produce filtered signal voltage, as indicated by block 230, and communicating the filtered signal voltage to the ECU, as indicated by block 232. In this embodiment, the step 204 of determining rotational speed of the turbocharger shaft 38 is further defined as calculating the rotational speed of the turbocharger shaft 38 using the filtered signal voltage communicated to the ECU, as indicated by block 234. The signal voltage may be filtered to produce the filtered signal voltage by using the accelerometer 58, the microprocessor 63, or any other suitable component. In this embodiment, the step 230 of filtering the signal voltage may be completed using the accelerometer 58 or the microprocessor 63. Filtering the signal voltage to produce the filtered signal voltage and communicating the filtered signal voltage to the ECU 64 allows the ECU 64 to calculate rotational speed of the turbocharger shaft 38 without the need to first filter the signal voltage using the ECU 64.

With reference to FIGS. 14-23, a method 300 of analyzing acceleration data of the turbocharger 30 of the internal combustion engine 31 of the vehicle 33 to perform diagnostics of one of the turbocharger 30, the internal combustion engine 31, and the vehicle 33 includes the step of detecting vibration of at least one of the turbine housing 32, the compressor housing 40, the bearing housing 46, and the actuator housing 52 to obtain acceleration data of at least one of the turbine housing 32, the compressor housing 40, the bearing housing 46, and the actuator housing 52 using the accelerometer 58, as indicated by block 302. The method 300 also includes the step of analyzing the acceleration data to perform diagnostics of at least one of the turbocharger 30, the internal combustion engine 31, and the vehicle 33, as indicated by block 304.

Figure 15:
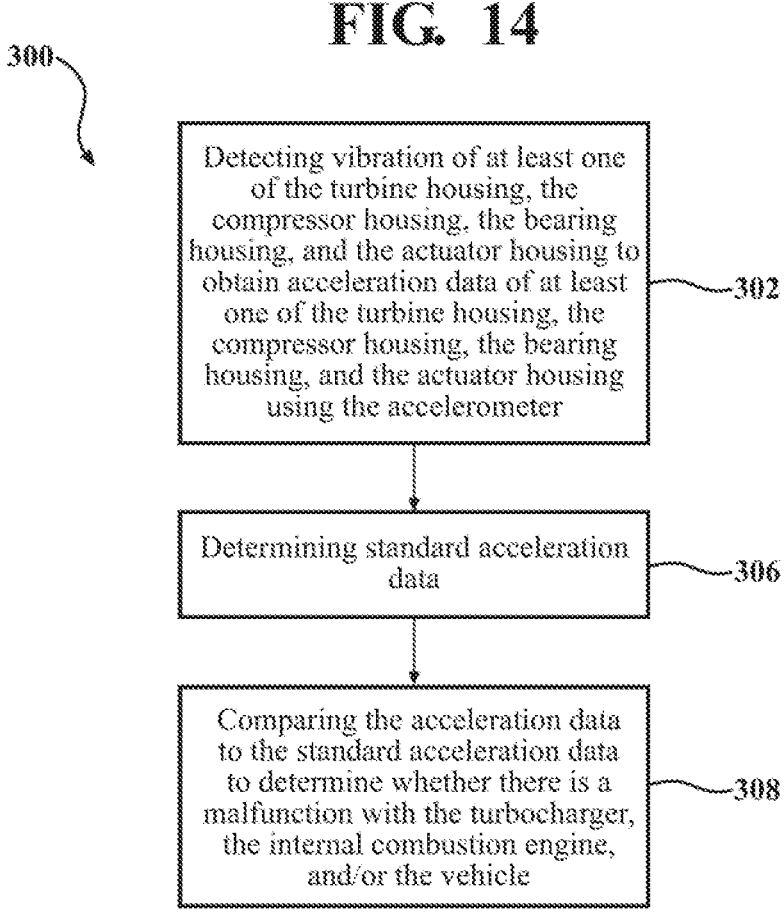
FIG. 15 is a flowchart of the method of FIG. 14, further including the step of determining standard acceleration data, and with the step of analyzing the acceleration data to perform diagnostics being further defined as comparing the acceleration data to the standard acceleration data to determine whether there is a malfunction with the turbocharger, the internal combustion engine, and/or the vehicle.

As shown in FIG. 15, the method 300 of analyzing acceleration data of the turbocharger 30 of the internal combustion engine 31 of the vehicle 33 to perform diagnostics of one of the turbocharger 30, the internal combustion engine 31, and the vehicle 33 may further include the step of determining standard acceleration data, as indicated by block 306. In this embodiment, the step 304 of analyzing the acceleration data to perform diagnostics is further defined as comparing the acceleration data to the standard acceleration data to determine whether there is a malfunction with the turbocharger 30, the internal combustion engine 31, and/or the vehicle 33, as indicated by block 308.

For example, a malfunction of an engine mount, a loose manifold, a crash of the vehicle 33, or the like may be detected using the accelerometer 58. As described above, the standard acceleration data is typically obtained during testing of the turbocharger 30 under controlled operating conditions. As the turbocharger 30 is tested under controlled operating conditions, the standard acceleration data obtained represents the vibration of the turbine housing 32, the compressor housing 40, and the bearing housing 46 that occurs during normal operation of the turbocharger 30. The acceleration data obtained by the accelerometer 58 is compared to the standard acceleration data to determine whether the acceleration data deviates outside of the standard acceleration data, which may be caused by a loose engine mount, a loose manifold, a crash of the vehicle 33, or the like. It is to be appreciated that the standard acceleration data may be compared to the acceleration data or filtered acceleration data, as described in further detail below.

Figure 16:
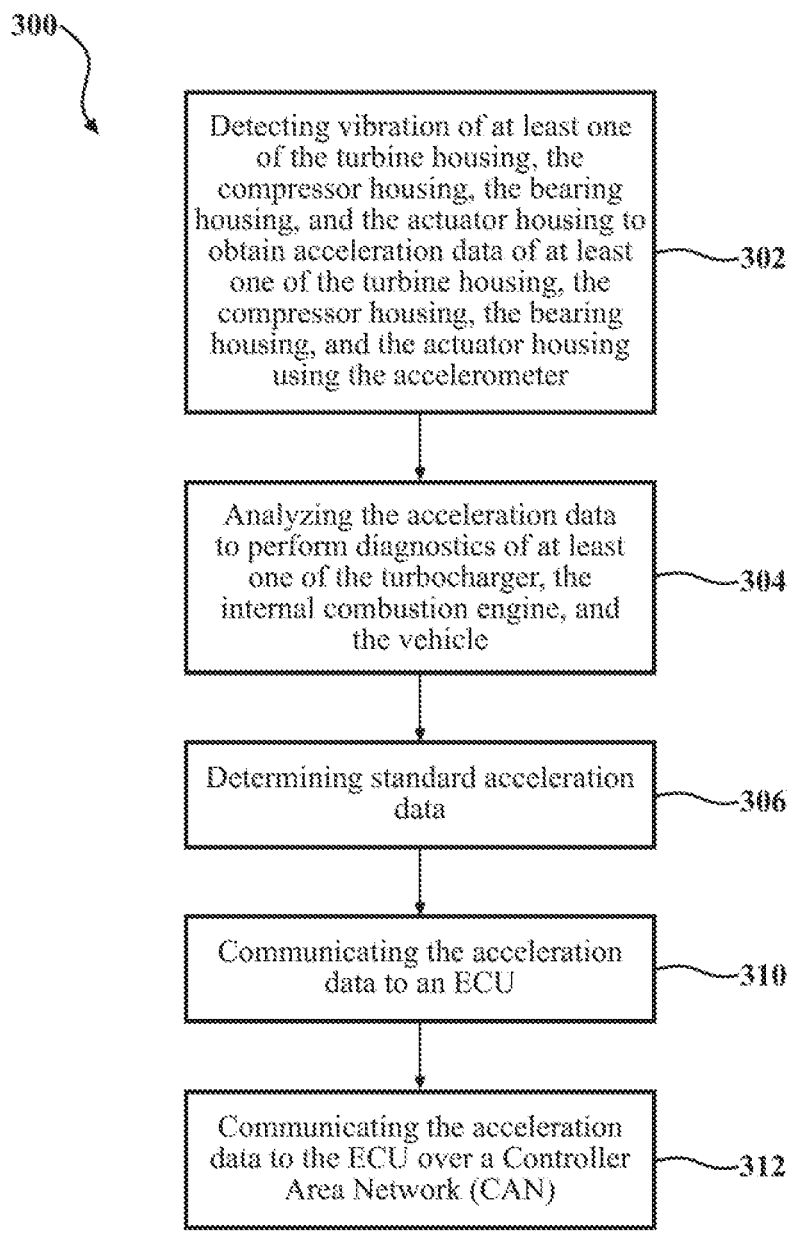
FIG. 16 is a flowchart of the method of FIG. 14, further including the steps of determining standard acceleration data, communicating the acceleration data to the ECU, and communicating the acceleration data to the ECU over the CAN.

With reference to FIG. 16, the method 300 of analyzing acceleration data of the turbocharger 30 of the internal combustion engine 31 of the vehicle 33 to perform diagnostics of one of the turbocharger 30, the internal combustion engine 31, and the vehicle 33 may further include the steps of determining standard acceleration data, as indicated by block 306, and communicating the acceleration data to the ECU 64, as indicated by block 310. The method 300 may further comprise the step of communicating the acceleration data to the ECU 64 over the CAN 66, as indicated by block 312. As described above, communicating the acceleration data to the ECU 64 over the CAN 66 allows the ECU 64 to receive the acceleration data without being directly wired to the microprocessor 63. This allows the microprocessor 63 to send the acceleration data to the ECU 64 without a direct wire connection and without a host computer. Accordingly, the microprocessor 63 may send the acceleration data to the ECU 64 at any location of the ECU 64 in the vehicle 33. It is to be appreciated that the microprocessor 63 may send the acceleration data to the ECU 64 over a Flexray, Local Interconnect Network (LIN), Pulse-Width Modulation (PWM), or Ethernet.

Figure 17:
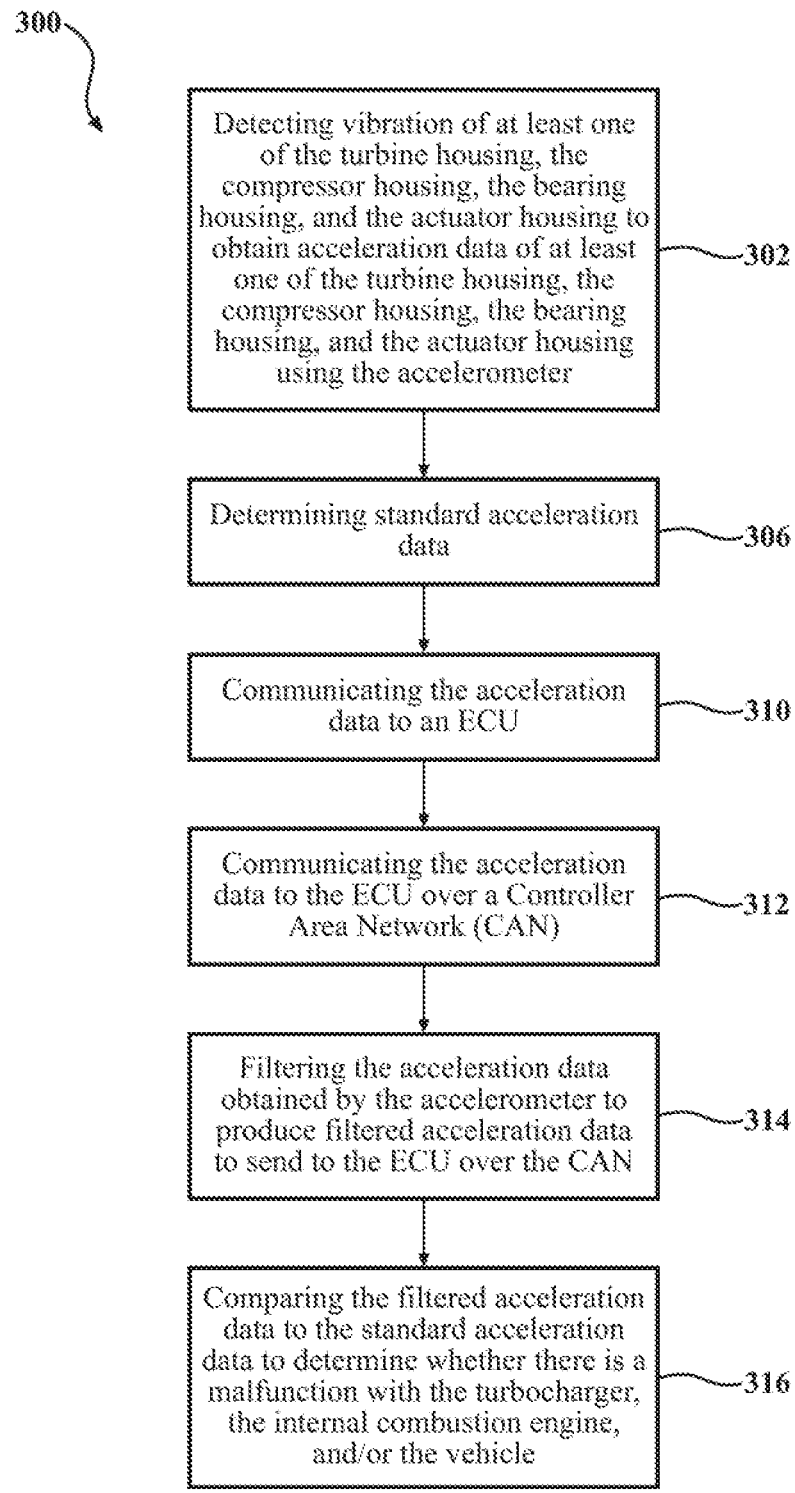
FIG. 17 is a flowchart of the method of FIG. 16, with the step of analyzing the acceleration data to perform diagnostics is further defined as filtering the acceleration data obtained by the accelerometer to produce filtered acceleration data to send to the ECU over the CAN, and comparing the filtered acceleration data to the standard acceleration data to determine whether there is a malfunction with the turbocharger, the internal combustion engine, and/or the vehicle.

As shown in FIG. 17, the step 304 of analyzing the acceleration data to perform diagnostics may be further defined as filtering the acceleration data obtained by the accelerometer 58 to produce filtered acceleration data to send to the ECU 64 over the CAN 66, as indicated by block 314, and comparing the filtered acceleration data to the standard acceleration data to determine whether there is a malfunction with the turbocharger 30, the internal combustion engine 31, and/or the vehicle 33, as indicated by block 316. The filtering of the acceleration data obtained by the accelerometer 58 may be completed by the accelerometer 58 or the microprocessor 63. In this embodiment, the ECU 64 compares the filtered acceleration data to the standard acceleration data. If the filtered acceleration data deviates from the standard acceleration data, the ECU 64 analyzes the filtered acceleration data to determine if there was a malfunction with the turbocharger 30, the internal combustion engine 31, and/or the vehicle 33. Depending on the deviation of the filtered acceleration data from the standard acceleration data, the ECU 64 determines whether the malfunction occurred to the turbocharger 30, the internal combustion engine 31, or the vehicle 33. As described above, some non-limiting examples of malfunctions include loose engine mount, a loose manifold, a crash of the vehicle 33, or the like.

Figure 18:
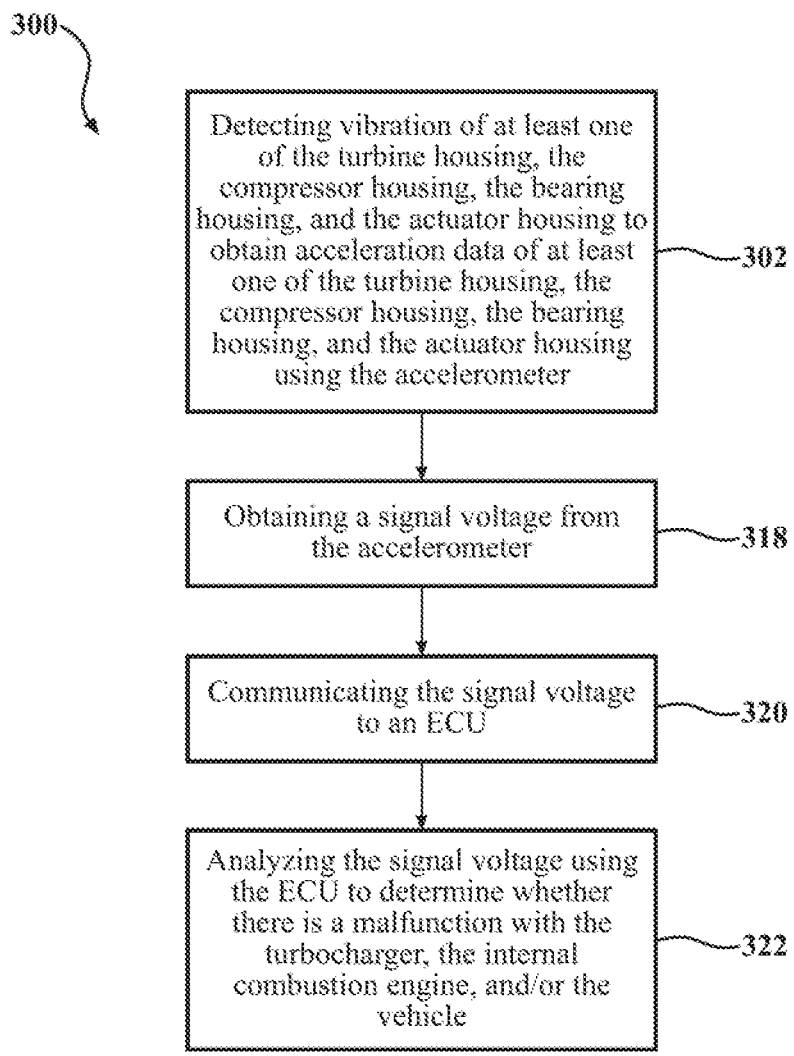
FIG. 18 is a flowchart of the method of FIG. 14, further including the steps of obtaining a signal voltage from the accelerometer, and communicating the signal voltage to the ECU, with the step of analyzing the acceleration data to perform diagnostics being further defined as analyzing the signal voltage using the ECU to determine whether there is a malfunction with the turbocharger, the internal combustion engine, and/or the vehicle.

As shown in FIG. 18, the method 300 of analyzing acceleration data of the turbocharger 30 of the internal combustion engine 31 of the vehicle 33 to perform diagnostics of one of the turbocharger 30, the internal combustion engine 31, and the vehicle 33 may further comprise the steps of obtaining a signal voltage from the accelerometer 58, as indicated by block 318, and communicating the signal voltage to the ECU 64, as indicated by block 320. Typically, the signal voltage is communicated to the ECU by the microprocessor 63. In this embodiment, the step 304 of analyzing the acceleration data to perform diagnostics is further defined as analyzing the signal voltage using the ECU 64 to determine whether there is a malfunction with the turbocharger 30, the internal combustion engine 31, and/or the vehicle 33, as indicated by block 322. In this embodiment, the ECU 64 is used to determine whether there is a malfunction with the turbocharger 30, the internal combustion engine 31, and/or the vehicle 33 using the signal voltage. Having the ECU 64 determine whether there is a malfunction with the turbocharger 30, the internal combustion engine 31, and/or the vehicle 33 using the signal voltage representing the acceleration data, which is often a raw signal voltage representing the acceleration data, allows the ECU 64 to determine whether there is a malfunction with the turbocharger 30, the internal combustion engine 31, and/or the vehicle 33. Having the ECU 64 determine whether there is a malfunction with the turbocharger 30, the internal combustion engine 31, and/or the vehicle 33 using the raw signal voltage may remove the need for an additional component to determining whether there is a malfunction with the turbocharger 30, the internal combustion engine 31, and/or the vehicle 33.

Figure 19:
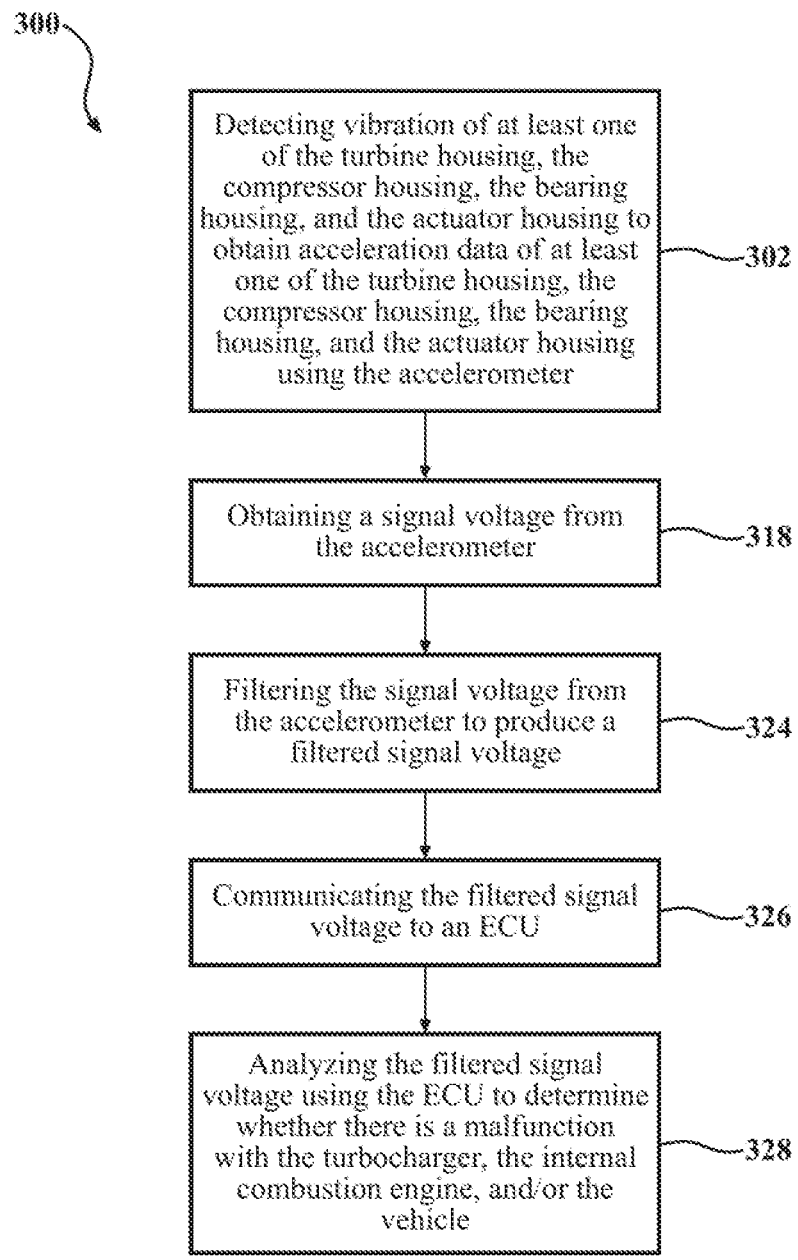
FIG. 19 is a flowchart of the method of FIG. 14, further comprising the steps of obtaining a signal voltage from the accelerometer, filtering the signal voltage from the accelerometer to produce a filtered signal voltage, and communicating the filtered signal voltage to an ECU, with the step of analyzing the acceleration data to perform diagnostics being further defined as analyzing the filtered signal voltage using the ECU to determine whether there is a malfunction with the turbocharger, the internal combustion engine, and/or the vehicle.

With reference to FIG. 19, the method 300 of analyzing acceleration data of the turbocharger 30 of the internal combustion engine 31 of the vehicle 33 to perform diagnostics of one of the turbocharger 30, the internal combustion engine 31, and the vehicle 33 may further comprise the steps of obtaining a signal voltage from the accelerometer 58, as indicated by block 318, filtering the signal voltage from the accelerometer 58 to produce a filtered signal voltage, as indicated by block 324, and communicating the filtered signal voltage to the ECU 64, as indicated by block 326. In this embodiment, the step 304 of analyzing the acceleration data to perform diagnostics is further defined as analyzing the filtered signal voltage using the ECU 64 to determine whether there is a malfunction with the turbocharger 30, the internal combustion engine 31, and/or the vehicle 33, as indicated by block 328. In this embodiment, the step 324 of filtering the signal voltage may be completed using the accelerometer 58 or the microprocessor 63. Filtering the signal voltage to produce the filtered signal voltage and communicating the filtered signal voltage to the ECU 64 allows the ECU 64 to determine whether there is a malfunction with the turbocharger 30, the internal combustion engine 31, and/or the vehicle 33 without the need to first filter the signal voltage using the ECU 64.

Figure 20:
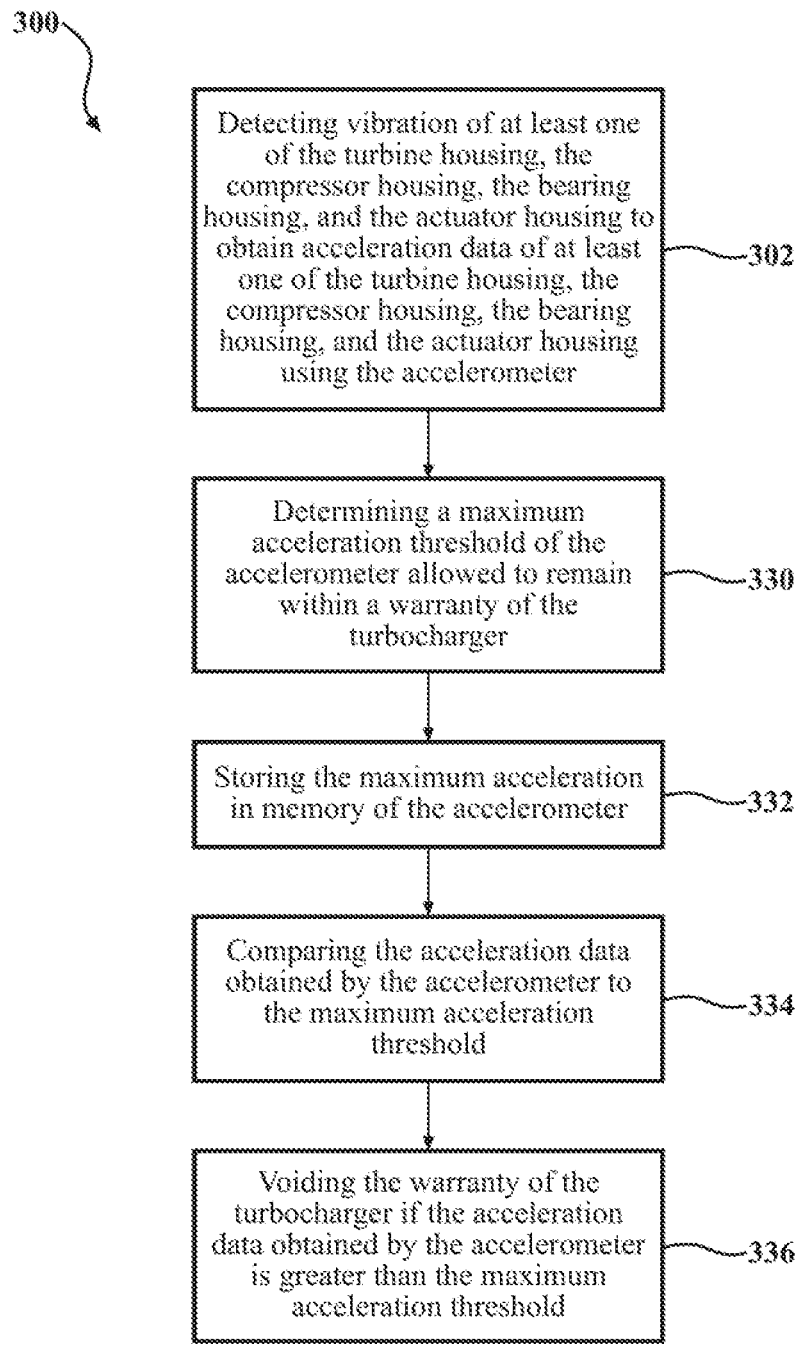
FIG. 20 is a flowchart of the method of FIG. 14, further comprising the steps of determining a maximum acceleration threshold of the accelerometer allowed to remain within a warranty of the turbocharger, and storing the maximum acceleration within memory of the accelerometer, with the step of analyzing the acceleration data to perform diagnostics being further defined as comparing the acceleration data obtained by the accelerometer to the maximum acceleration threshold, and voiding the warranty of the turbocharger if the acceleration data obtained by the accelerometer is greater than the maximum acceleration threshold.

With reference to FIG. 20, the method 300 of analyzing acceleration data of the turbocharger 30 of the internal combustion engine 31 of the vehicle 33 to perform diagnostics of one of the turbocharger 30, the internal combustion engine 31, and the vehicle 33 may further comprise the steps of determining a maximum acceleration threshold of the accelerometer 58 allowed to remain within a warranty of the turbocharger, as indicated by block 330, and storing the maximum acceleration threshold within memory of the accelerometer, as indicated by block 332. The maximum acceleration threshold may be stored within memory of an additional memory chip. In this embodiment, the step 304 of analyzing the acceleration data to perform diagnostics is further defined as comparing the acceleration data obtained by the accelerometer 58 to the maximum acceleration threshold, as indicated by block 334, and voiding the warranty of the turbocharger 30 if the acceleration data obtained by the accelerometer 58 is greater than the maximum acceleration threshold, as indicated by block 336.

The maximum acceleration threshold may be any value of acceleration that the accelerometer 58 detects that exceeds a predetermined value. In some embodiments, the predetermined value is determined by the standard acceleration data, which may relate to the standard acceleration data obtained when the rotational speed of the turbocharger shaft 38 is within proper operating range. The step 334 of comparing the acceleration data obtained by the accelerometer 58 to the maximum acceleration threshold, and the step 336 of voiding the warranty of the turbocharger 30 if the acceleration data obtained by the accelerometer 58 is greater than the maximum acceleration threshold is advantageous as a turbocharger manufacturer may compare the acceleration data to the maximum acceleration threshold to determine whether a user of the turbocharger 30 was exceeding terms within an application agreement. The application agreement is typically an agreement between the turbocharger manufacturer and the user, which sets forth the terms of use of the turbocharger 30. The turbocharger manufacturer may include threshold rotational speed of the turbocharger shaft 38 within the application agreement. The turbocharger manufacturer may void the warranty of the turbocharger 30 if the acceleration data obtained by the accelerometer 58 reveals that the user was exceeding the threshold rotational speed of the turbocharger shaft 38 disclosed within the application agreement. If the acceleration data obtain by the accelerometer 58 reveals that the user exceeded the threshold rotational speed of the turbocharger shaft 38 within the application agreement, the turbocharger manufacturer will know that the user has violated the application agreement and, therefore, void any warranty on the turbocharger 30

Figure 21:
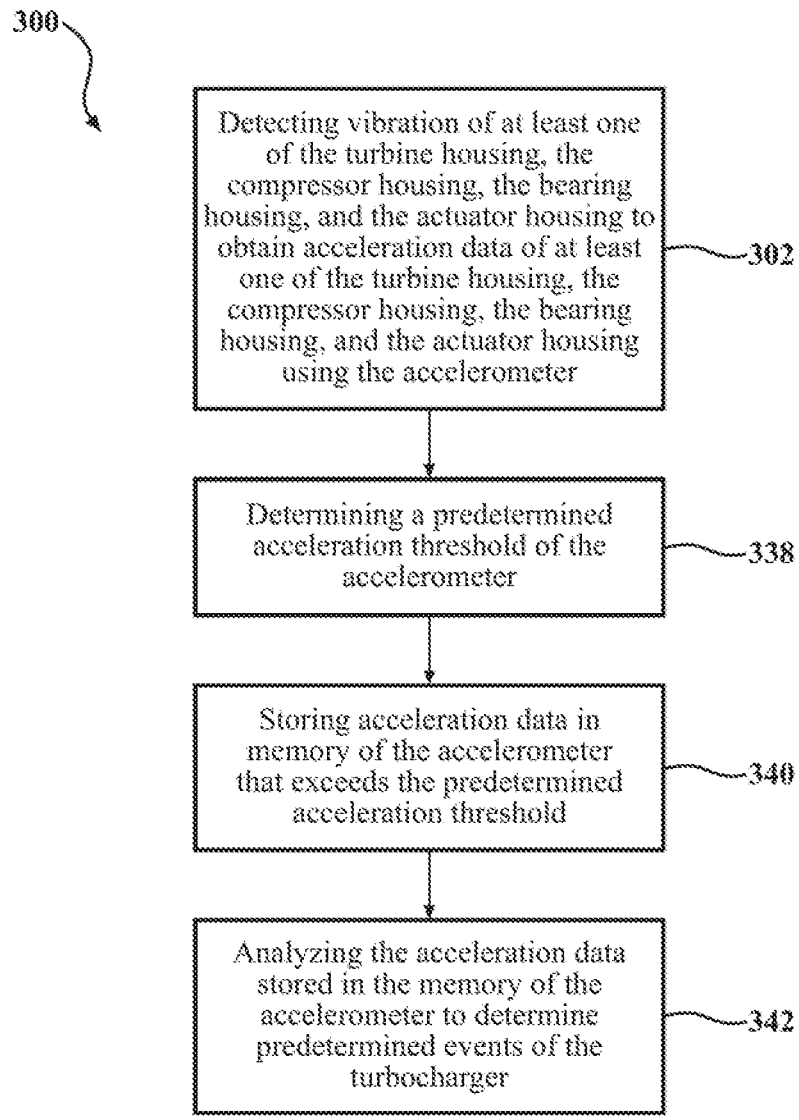
FIG. 21 is a flowchart of the method of FIG. 14, further comprising the steps of determining a predetermined acceleration threshold of the accelerometer, and storing acceleration data within memory of the accelerometer that exceeds the predetermined acceleration threshold, with the step of analyzing the acceleration data to perform diagnostics being further defined as analyzing the acceleration data stored within the memory of the accelerometer to determine predetermined events of the turbocharger.

With reference to FIG. 21, the method 300 of analyzing acceleration data of the turbocharger 30 of the internal combustion engine 31 of the vehicle 33 to perform diagnostics of one of the turbocharger 30, the internal combustion engine 31, and the vehicle 33 may further comprise the steps of determining a predetermined acceleration threshold of the accelerometer 58, as indicated by block 338, and storing acceleration data within memory of the accelerometer 58 that exceeds the predetermined acceleration threshold, as indicated by block 340. The maximum acceleration threshold may be stored within memory of an additional memory chip. In this embodiment, the step 304 of analyzing the acceleration data to perform diagnostics is further defined as analyzing the acceleration data stored within the memory of the accelerometer 58 to determine predetermined events of the turbocharger, as indicated by block 342. Storing the acceleration data within memory of the accelerometer 58 that exceeds the predetermined acceleration threshold allows the turbocharger manufacturer to determine when and how the user exceeded the predetermined acceleration threshold.

Figure 22:
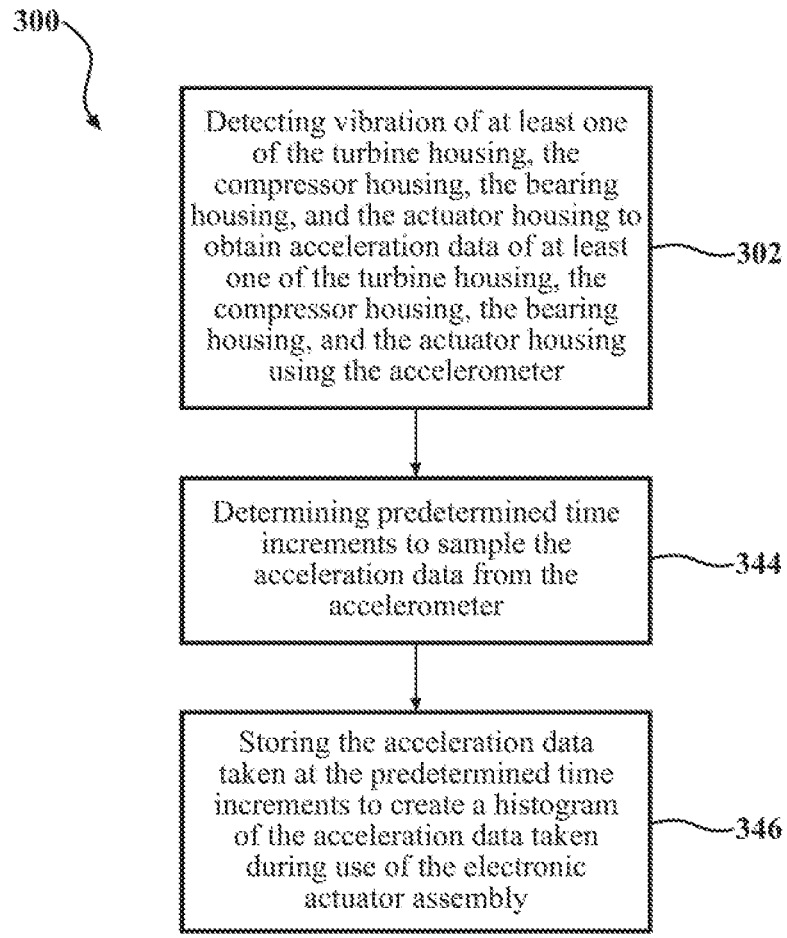
FIG. 22 is a flowchart of the method of FIG. 14, with the step of analyzing the acceleration data to perform diagnostics being further defined as determining predetermined time increments to sample the acceleration data from the accelerometer, and storing the acceleration data taken at the predetermined time increments to store a histogram of the acceleration data taken during use of the electronic actuator assembly.

As shown in FIG. 22, the step 304 of analyzing the acceleration data to perform diagnostics may be further defined as determining predetermined time increments to sample the acceleration data from the accelerometer 58, as indicated by block 344, and storing the acceleration data taken at the predetermined time increments to store a histogram of the acceleration data taken during use of the electronic actuator assembly 50, as indicated by block 346. The user or turbocharger manufacturer may then analyze the histogram to help the turbocharger manufacturer determine whether certain thresholds, such as rotational speed of the turbocharger shaft 38, have been exceeded. Furthermore, the histogram will allow the turbocharger manufacturer to determine when and how many times the user exceeded the predetermined acceleration threshold.

The step of analyzing the acceleration data to perform diagnostics of at least one of the turbocharger 30, the internal combustion engine 31, and the vehicle 33 may be further defined as recording the acceleration data. The acceleration data may be recorded by running a buffer log. For example, the acceleration data may be recorded within a buffer log at specific events, with the buffer log maintaining a recorded value of the acceleration data at each specific event. Specific events include, but are not limited to, the accelerometer 58 exceeding the standard acceleration data, such as a predetermined g force. The turbocharger manufacturer may then analyze the buffer log to determine whether the user of the turbocharger 30 has exceeded the standard acceleration data. When the acceleration data within the buffer log exceeds a standard acceleration data, the accelerometer 58 may transmit the acceleration data to the ECU 64. The accelerometer 58 may be continuously transmit the acceleration data to the ECU 64 at regular intervals. The accelerometer 58 may log a running average g level along with peak levels.

Figure 23:
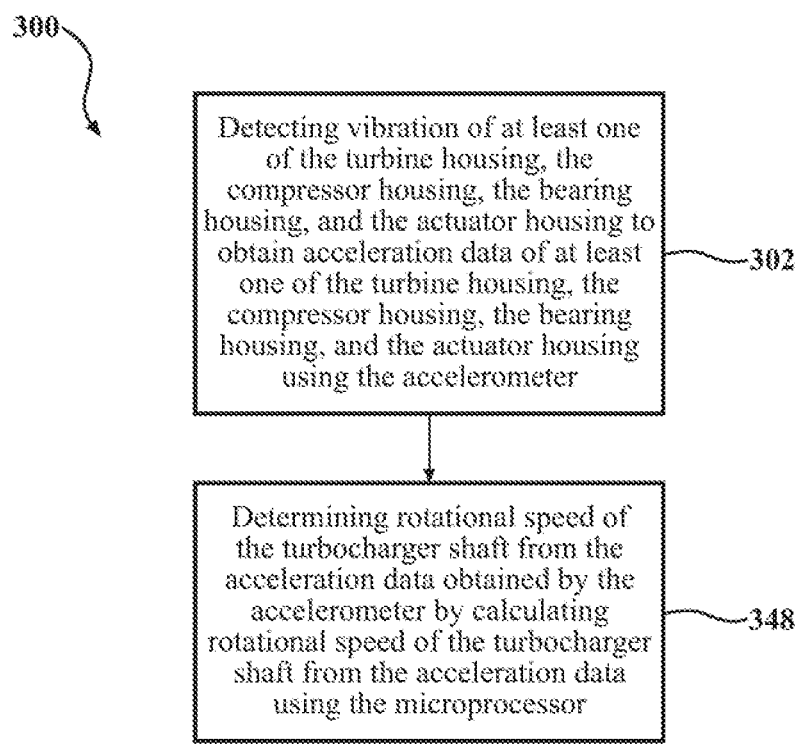
FIG. 23 is a flowchart of the method of FIG. 14, with the step of analyzing the acceleration data to perform diagnostics being further defined as determining rotational speed of the turbocharger shaft from the acceleration data obtained by the accelerometer by calculating rotational speed of the turbocharger shaft from the acceleration data using the accelerometer.
Figure 24:
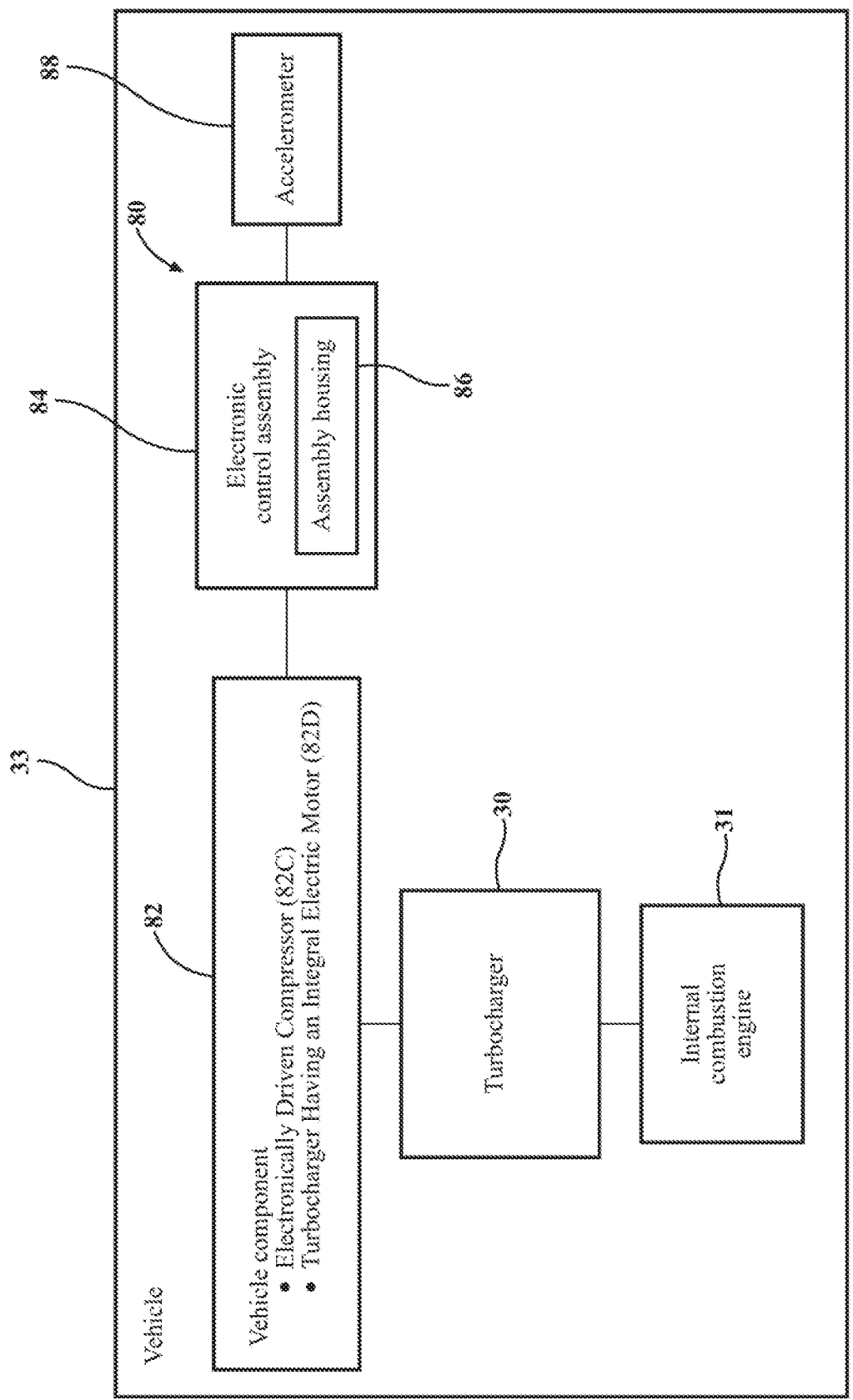
FIG. 24 is schematic illustration of a vehicle, an internal combustion engine, a turbocharger, a vehicle component coupled to the turbocharger, an electronic control assembly having an assembly housing, and an accelerometer coupled to the electronic control assembly.
Figure 25:
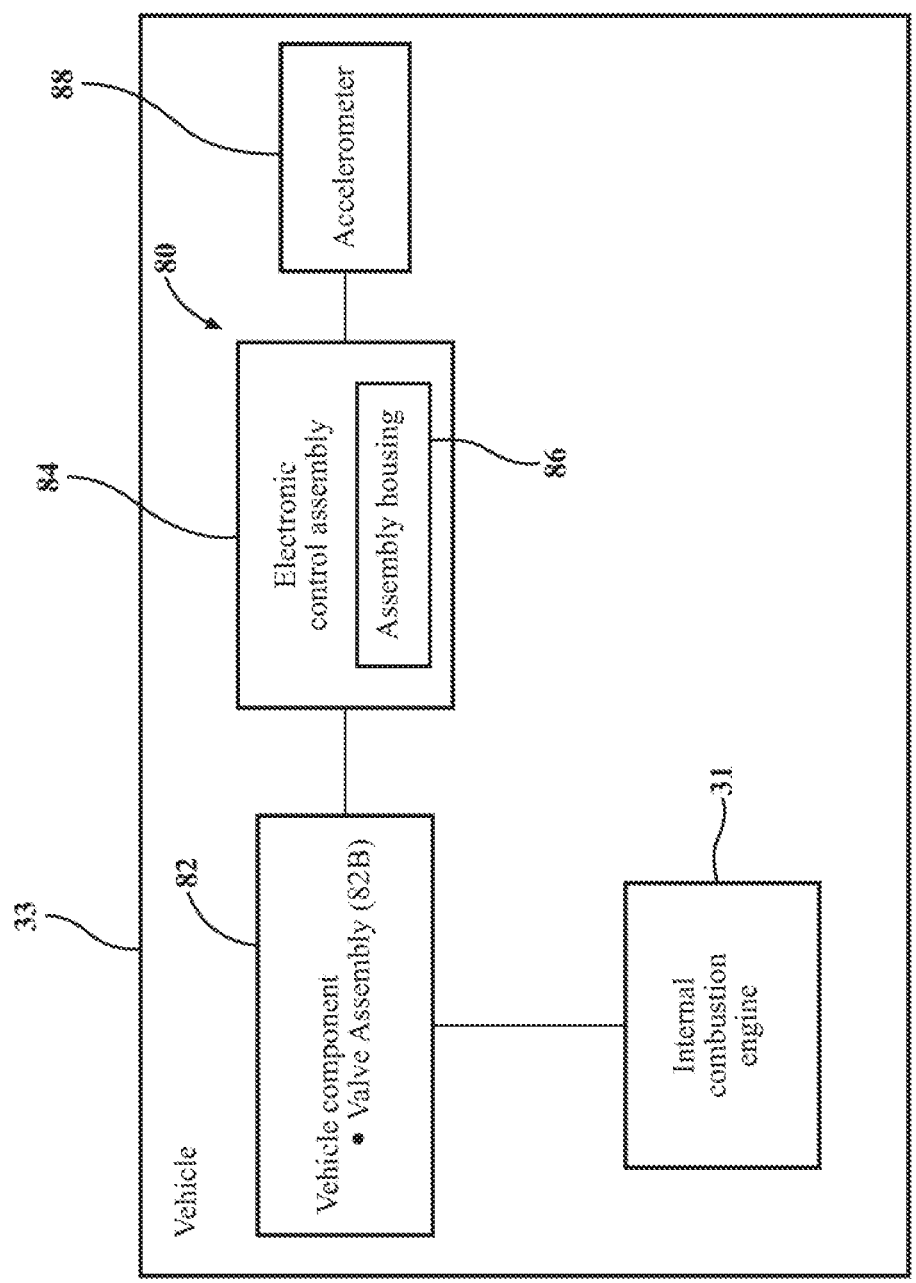
FIG. 25 is a schematic illustration of a vehicle, an internal combustion engine, a vehicle component, an electronic control assembly having an assembly housing, and an accelerometer coupled to the electronic control assembly.
Figure 26:
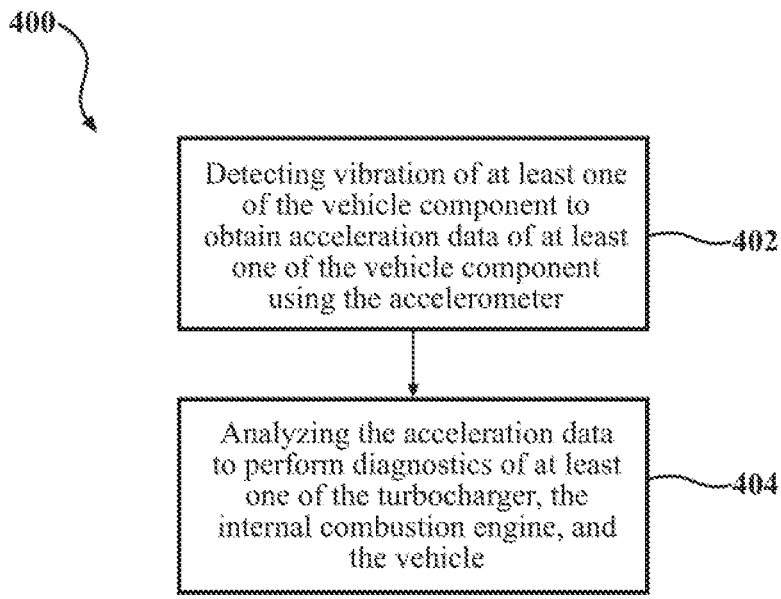
FIG. 26 is a flowchart of a method for analyzing acceleration data of a vehicle component to perform diagnostics of one of the vehicle component, the internal combustion engine, and the vehicle.

In one embodiment, as shown in FIG. 23, the step 304 of analyzing the acceleration data to perform diagnostics is further defined as determining rotational speed of the turbocharger shaft from the acceleration data obtained by the accelerometer 58 by calculating rotational speed of the turbocharger shaft 38 from the acceleration data using the microprocessor 63, as indicated by block 348.

Referring now to the embodiment illustrated in FIGS. 24-31, during vehicle operation, many elements of the vehicle may vibrate. Therefore, the vehicle may also include a vibration detection assembly 80. The vibration detection assembly 80 may be implemented in any vehicle, and specifically, a vehicle having an internal combustion engine. The vibration detection assembly 80 includes a vehicle component 82. It is contemplated that the vehicle component 82 may be one or more of a turbocharger 82A, a valve assembly 82B, an electronically driven compressor 82C, a turbocharger having an integral electric motor 82D and the like. It is additionally contemplated that the vehicle component 82 may be another component of the vehicle such as the internal combustion engine or another component as known by one of ordinary skill in the art.

The embodiment where the vehicle component 82 is a turbocharger 82A is further described in more detail above. In one exemplary embodiment, the vehicle component is the valve assembly 82B. In another exemplary embodiment, the vehicle component is the electronically driven compressor 82C. In another exemplary embodiment, the vehicle component 82 is the turbocharger having the integral electric motor 82D. In yet another exemplary embodiment, the vehicle component 82 is the turbocharger 82A and the valve assembly 82B. In another exemplary embodiment, the vehicle component 82 is the turbocharger 82A and the electronically driven compressor 82C. In another exemplary embodiment, the vehicle component 82 is the turbocharger 82A and the turbocharger having the integral electric motor 82D. In another exemplary embodiment, the vehicle component 82 is the valve assembly 82B and the electronically driven compressor 82C. In another exemplary embodiment, the vehicle component 82 is the valve assembly 82B and the turbocharger having the integral electric motor 82D. In another exemplary embodiment, the vehicle component 82 is the electronically driven compressor 82C and the turbocharger having the integral electric motor 82D. In another exemplary embodiment, the vehicle component 82 is the turbocharger 82A, the valve assembly 82B, and the electronically driven compressor 82C. In another exemplary embodiment, the vehicle component 82 is the turbocharger 82A, the valve assembly 82B, and the turbocharger having the integral electric motor 82D. In another exemplary embodiment, the vehicle component 82 is the turbocharger 82A, the electronically driven compressor 82C, and the turbocharger having the integral electric motor 82D. In another exemplary embodiment, the vehicle component 82 is the valve assembly 82B, the electronically driven compressor 82C, and the turbocharger having the integral electric motor 82D. In yet another exemplary embodiment, the vehicle component 82 is the turbocharger 82A, the valve assembly 82B, the electronically driven compressor 82C, and the turbocharger having the integral electric motor 82D.

In the embodiment where the vehicle component 82 is the valve assembly 82B, the valve assembly 82B may be an intake throttle valve or an exhaust gas recirculation (EGR) valve. It is also contemplated that the valve assembly 82B may be another valve assembly disposed within the vehicle as known by one of ordinary skill in the art. It is contemplated that the valve assembly 82B may be used in applications where the vehicle includes a turbocharger or may be used in applications where the vehicle does not include a turbocharger. In the embodiment where the vehicle component 82 is an electronically driven compressor 82C, the electronically driven compressor 82C may be part of an eBooster® system or may be part of any other system as known by one of ordinary skill in the art. In the embodiment where the vehicle component 82 is a turbocharger having an integral electric motor 82D, the turbocharger having an integral electric motor 82D may be a part of the eTurbo® system or may be part of any other system as known by one of ordinary skill in the art.

The vibration detection assembly 80 also includes an electronic control assembly 84. The electronic control assembly 84 may be any controller as known by one of ordinary skill in the art. Additionally, or alternatively, the electronic control assembly 84 may be similar to the electronic control unit (ECU) described above or may include a separate controller used in conjunction with the ECU and/or the microprocessor as described above. In addition, the electronic control assembly 84 may operate similarly to the ECU described above including, but not limited to, having a printed circuit board and transmitting a signal from the ECU over a CAN. It is additionally contemplated that the electronic control assembly 84 may operate using other methods as known by one of ordinary skill in the art.

The vibration detection assembly 80 also includes an assembly housing 86. The assembly housing 86 may be similar to the actuator housing as described above, or may be any other type of housing as known by one of ordinary skill in the art. For example, if the vehicle component 82 is the valve assembly 82A, then the assembly housing 86 is a valve housing. It is contemplated that the assembly housing 86 may house the electronic control assembly 84. However, it is also contemplated that the electronic control assembly 84 may be otherwise coupled to the assembly housing 86. The assembly housing 86 may be comprised of any material as known by one of ordinary skill in the art including, but not limited to, a plastic polymer, steel, aluminum, and the like.

The electronic control assembly 84 also includes an accelerometer 88. The accelerometer 88 may be identical or similar to the accelerometer 58 described above and is adapted to detect vibration of the vehicle component 82. In one embodiment, the accelerometer 88 is coupled to at least one of the vehicle component 82 in order to detect the vibration of the vehicle component 82. Moreover, the accelerometer 88, as described in the embodiment described above, is configured to obtain acceleration data of the vehicle component 82 to perform diagnostics of at least one of the vehicle component 82, the internal combustion engine, or the vehicle. The accelerometer 88 may assist in correlating the acceleration data to standard acceleration data corresponding to the vibration of one of the vehicle component 82. To determine the standard acceleration data, the vehicle component 82 may be tested under controlled operating conditions, as described in more exemplary detail above.

As also described above, the accelerometer 88, and more specifically, the standard acceleration data gathered from the accelerometer 88 may be used to determine a rotational speed in at least one of the vehicle component 82 and/or the internal combustion engine. In the embodiment described above, the standard acceleration data is used to determine the rotational speed of the turbocharger, however, the rotational speed of any of the other vehicle components and/or the internal combustion engine may be determined using the standard acceleration data of the accelerometer 88. The rotational speed may be determined or calculated using the standard acceleration data or other data of the accelerometer by the exemplary method described above, or by any other method as known by one of ordinary skill in the art.

Additionally, the accelerometer 88 may be a two-axis accelerometer. The accelerometer 88 may be a micromechanical systems (MEMS) sensor. An example of a suitable two-axis accelerometer 88 includes, but is not limited to, ST Microelectronic's AIS1200PS accelerometer. The AIS1200PS accelerometer operates between five and 16 volts, has a +/−200 g capability, and is able to operate between −40 to 125 degrees Celsius. Additionally, the AIS1200PS accelerometer is about 6×10 mm and has a 16 pin connection. Due to heat generated by the internal combustion engine 31, the vehicle component 82 such as the turbocharger 30 and, in turn, the accelerometer 88 are exposed to high operating temperatures caused by exhaust gas from the internal combustion engine 31. Typically, the electronic control assembly 84 is subjected to between 110 to 150 degrees Celsius. As such, the accelerometer 88 is typically selected to be able to operate within the operating temperature of the vehicle component 82. It is to be appreciated that any suitable two-axis accelerometer may be used without departing from the nature of the present invention. Using the two-axis accelerometer, whether the two-axis accelerometer is a MEMS sensor, such as the AIS1200PS accelerometer, or another suitable two-axis accelerometer, to detect vibration of at least one of the internal combustion engine, the vehicle, or the vehicle component 82.

It is also contemplated that the electronic control assembly 84 includes a second accelerometer. In one embodiment, the second accelerometer is a two-axis accelerometer. In such embodiments, the accelerometer 88 is a two-axis accelerometer, with the accelerometer 88 and the second accelerometer being adapted to detect three-axis vibration. Specifically, the accelerometer 88 and the second accelerometer are adapted to detect three-axis vibration because the accelerometer 88 detects two-axis vibration, for example X and Y axis, and the second two-axis accelerometer detects two-axis vibration, with one the axis being the Z axis. Alternatively, the accelerometer 88 may be a three-axis accelerometer to detect three-axis vibration. In embodiments where the electronic control assembly 84 includes the three-axis accelerometer, the electronic control assembly 84 may be free of other two-axis accelerometers. In other words, in embodiments where the electronic control assembly 84 includes the three-axis accelerometer, the electronic control assembly 84 may not include any two-axis accelerometer. In other embodiments, the accelerometer 88 may be a two-axis accelerometer and the second accelerometer may be a single axis accelerometer, with the accelerometer 88 and the second accelerometer adapted to detect three-axis vibration. In yet another embodiment, the electronic control assembly 84 may include a third accelerometer, with the third accelerometer, the accelerometer 88, and the second accelerometer all being single-axis accelerometers, and with the third accelerometer, the accelerometer 88, and the second accelerometer 68 adapted to detect three-axis vibration.

With reference to FIGS. 26-31, a method 400 of detecting vibration of at least one of the vehicle component 82 to obtain acceleration data of at least one of the vehicle component 82 using the accelerometer 88 is indicated by block 402. The method 400 also includes the step of analyzing the acceleration data to perform diagnostics of at least one of the vehicle component 82, the internal combustion engine, and the vehicle, as indicated by block 404.

Figure 27:
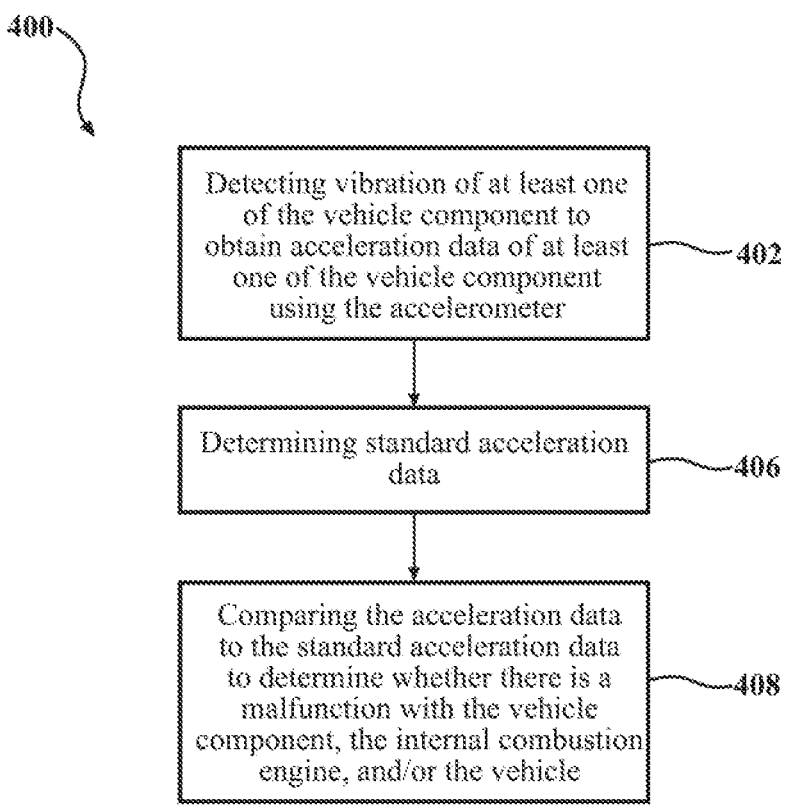
FIG. 27 is a flowchart of the method of FIG. 26, further including the step of determining standard acceleration data, and with the step of analyzing the acceleration data to perform diagnostics being further defined as comparing the acceleration data to the standard acceleration data to determine whether there is a malfunction with the vehicle component, the internal combustion engine, and/or the vehicle.

As illustrated in FIG. 27, the method 300 of analyzing acceleration data of the vehicle component 82 to perform diagnostics of the vehicle component 82, the internal combustion engine and the vehicle may further include the step of determining standard acceleration data, as indicated by block 406. In this embodiment, the step 406 of analyzing the acceleration data to perform diagnostics is further defined as comparing the acceleration data to the standard acceleration data to determine whether there is a malfunction with the vehicle component 82, the internal combustion engine, and/or the vehicle, as indicated in block 408.

For example, a malfunction of an engine mount, a loose manifold, a crash of the vehicle 33, or the like may be detected using the accelerometer 88. As described above, the standard acceleration data is typically obtained during testing of the vehicle component 82 under controlled operating conditions. As the vehicle component 82 is tested under controlled operating conditions, the standard acceleration data obtained represents the vibration of vehicle component 82 that occurs during normal operation of the vehicle component 82. The acceleration data obtained by the accelerometer 88 is compared to the standard acceleration data to determine whether the acceleration data deviates outside of the standard acceleration data, which may be caused by a loose engine mount, a loose manifold, a crash of the vehicle 33, or the like. It is to be appreciated that the standard acceleration data may be compared to the acceleration data or to the filtered acceleration data, as described in further detail below.

Figure 28:
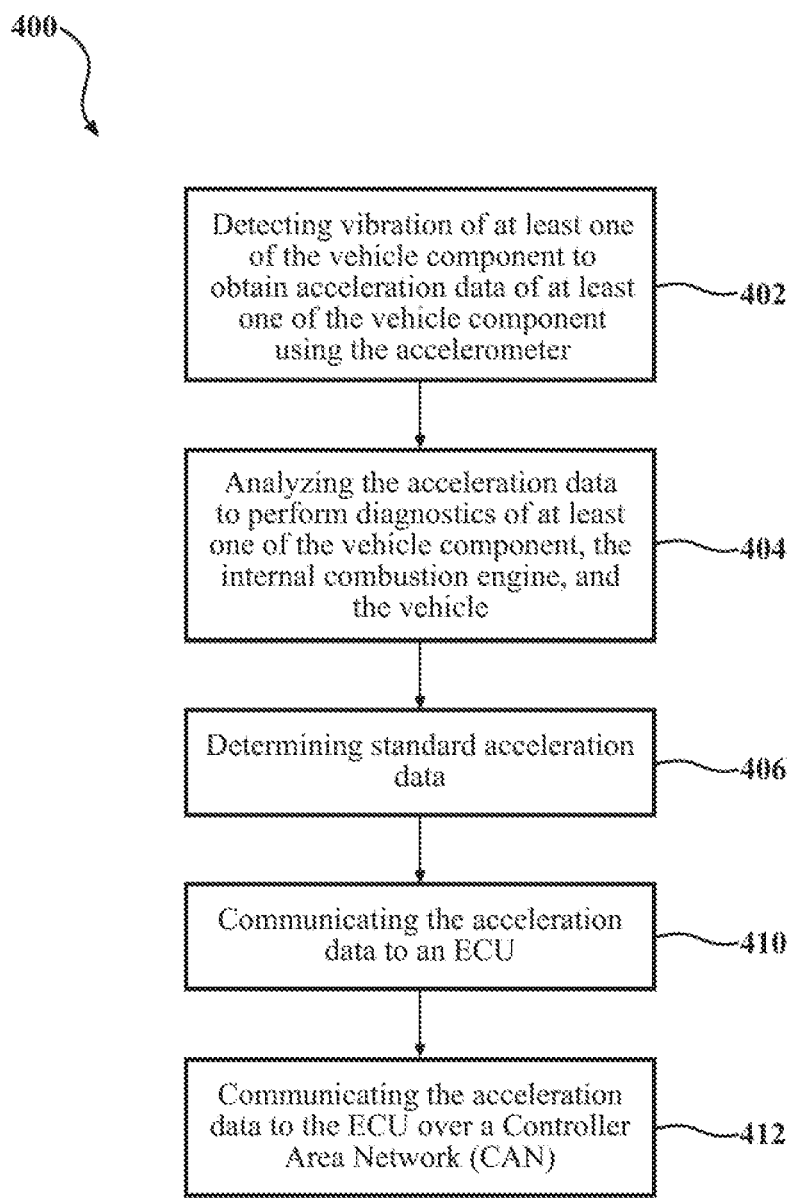
FIG. 28 is a flowchart of the method of FIG. 26, further including the steps of determining standard acceleration data, communicating the acceleration data to the ECU, and communicating the acceleration data to the ECU over the CAN.

Referring now to FIG. 28, the method 400 of analyzing acceleration data of the vehicle component 82 to perform diagnostics of one of the vehicle component 82, the internal combustion engine 31, and the vehicle 33 may further include the steps of determining standard acceleration data, as indicated by block 406, and communicating the acceleration data to the ECU 64, as indicated by block 410. The method 400 may further comprise the step of communicating the acceleration data to the ECU 64 over the CAN 66, as indicated by block 312. As described above, communicating the acceleration data to the ECU 64 over the CAN 66 allows the ECU 64 to receive the acceleration data without being directly wired to the microprocessor 63. This allows the microprocessor 63 to send the acceleration data to the ECU 64 without a direct wire connection and without a host computer. Accordingly, the microprocessor 63 may send the acceleration data to the ECU 64 at any location of the ECU 64 in the vehicle 33. It is to be appreciated that the microprocessor 63 may send the acceleration data to the ECU 64 over a Flexray, Local Interconnect Network (LIN), Pulse-Width Modulation (PWM), or Ethernet.

Figure 29:
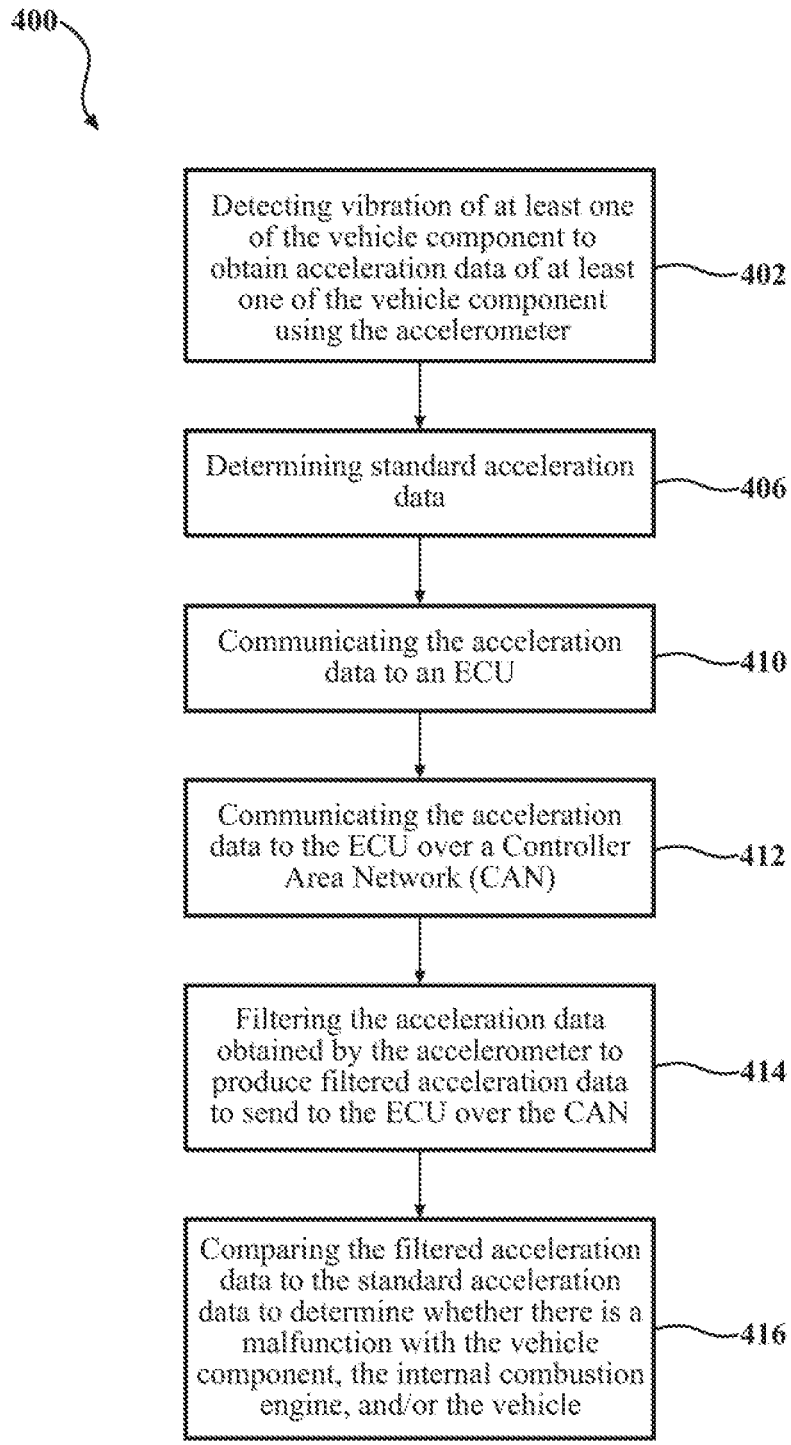
FIG. 29 is a flowchart of the method of FIG. 28, with the step of analyzing the acceleration data to perform diagnostics is further defined as filtering the acceleration data obtained by the accelerometer to produce filtered acceleration data to send to the ECU over the CAN, and comparing the filtered acceleration data to the standard acceleration data to determine whether there is a malfunction with the vehicle component, the internal combustion engine, and/or the vehicle.

As shown in FIG. 29, the step 404 of analyzing the acceleration data to perform diagnostics may be further defined as filtering the acceleration data obtained by the accelerometer 88 to produce filtered acceleration data to send to the ECU 64 over the CAN 66, as indicated by block 414, and comparing the filtered acceleration data to the standard acceleration data to determine whether there is a malfunction with the vehicle component 82, the internal combustion engine 31, and/or the vehicle 33, as indicated by block 416. The filtering of the acceleration data obtained by the accelerometer 88 may be completed by the accelerometer 88 or the microprocessor 63. In this embodiment, the ECU 64 compares the filtered acceleration data to the standard acceleration data. If the filtered acceleration data deviates from the standard acceleration data, the ECU 64 analyzes the filtered acceleration data to determine if there was a malfunction with the vehicle component 82, the internal combustion engine 31, and/or the vehicle 33. Depending on the deviation of the filtered acceleration data from the standard acceleration data, the ECU 64 determines whether the malfunction occurred to the vehicle component 82, the internal combustion engine 31, or the vehicle 33. As described above, some non-limiting examples of malfunctions include a loose engine mount, a loose manifold, a crash of the vehicle 33, and the like.

Figure 30:
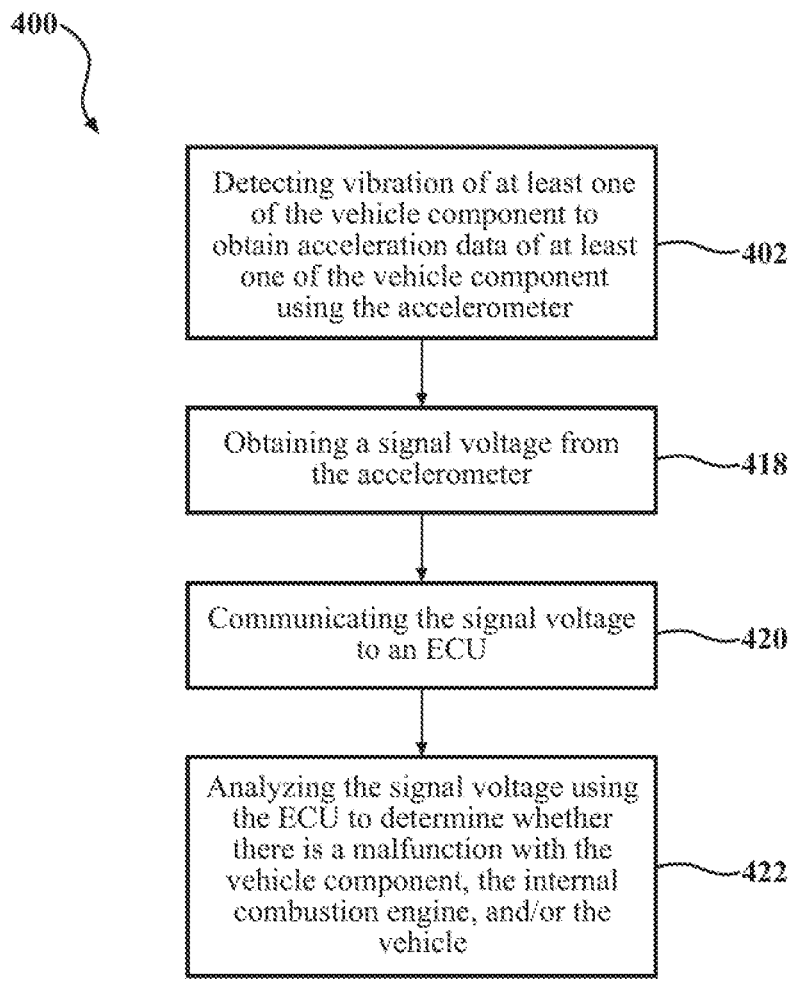
FIG. 30 is a flowchart of the method of FIG. 26, further including the steps of obtaining a signal voltage from the accelerometer, and communicating the signal voltage to the ECU, with the step of analyzing the acceleration data to perform diagnostics being further defined as analyzing the signal voltage using the ECU to determine whether there is a malfunction with the vehicle component, the internal combustion engine, and/or the vehicle.

As shown in FIG. 30, the method 400 of analyzing acceleration data of the vehicle component 82 to perform diagnostics of one of the vehicle component 82, the internal combustion engine 31, and the vehicle 33 may further comprise the steps of obtaining a signal voltage from the accelerometer 88, as indicated by block 418, and communicating the signal voltage to the ECU 64, as indicated by block 420. Typically, the signal voltage is communicated to the ECU by the microprocessor 63. In this embodiment, the step 404 of analyzing the acceleration data to perform diagnostics is further defined as analyzing the signal voltage using the ECU 64 to determine whether there is a malfunction with the vehicle component 82, the internal combustion engine 31, and/or the vehicle 33, as indicated by block 422. In this embodiment, the ECU 64 is used to determine whether there is a malfunction with the vehicle component 82, the internal combustion engine 31, and/or the vehicle 33 using the signal voltage. Having the ECU 64 determine whether there is a malfunction with the vehicle component 82, the internal combustion engine 31, and/or the vehicle 33 using the signal voltage representing the acceleration data, which is often a raw signal voltage representing the acceleration data, allows the ECU 64 to determine whether there is a malfunction with the vehicle component 82, the internal combustion engine 31, and/or the vehicle 33. Having the ECU 64 determine whether there is a malfunction with the vehicle component 82, the internal combustion engine 31, and/or the vehicle 33 using the raw signal voltage may remove the need for an additional component to determining whether there is a malfunction with the vehicle component 82, the internal combustion engine 31, and/or the vehicle 33.

Figure 31:
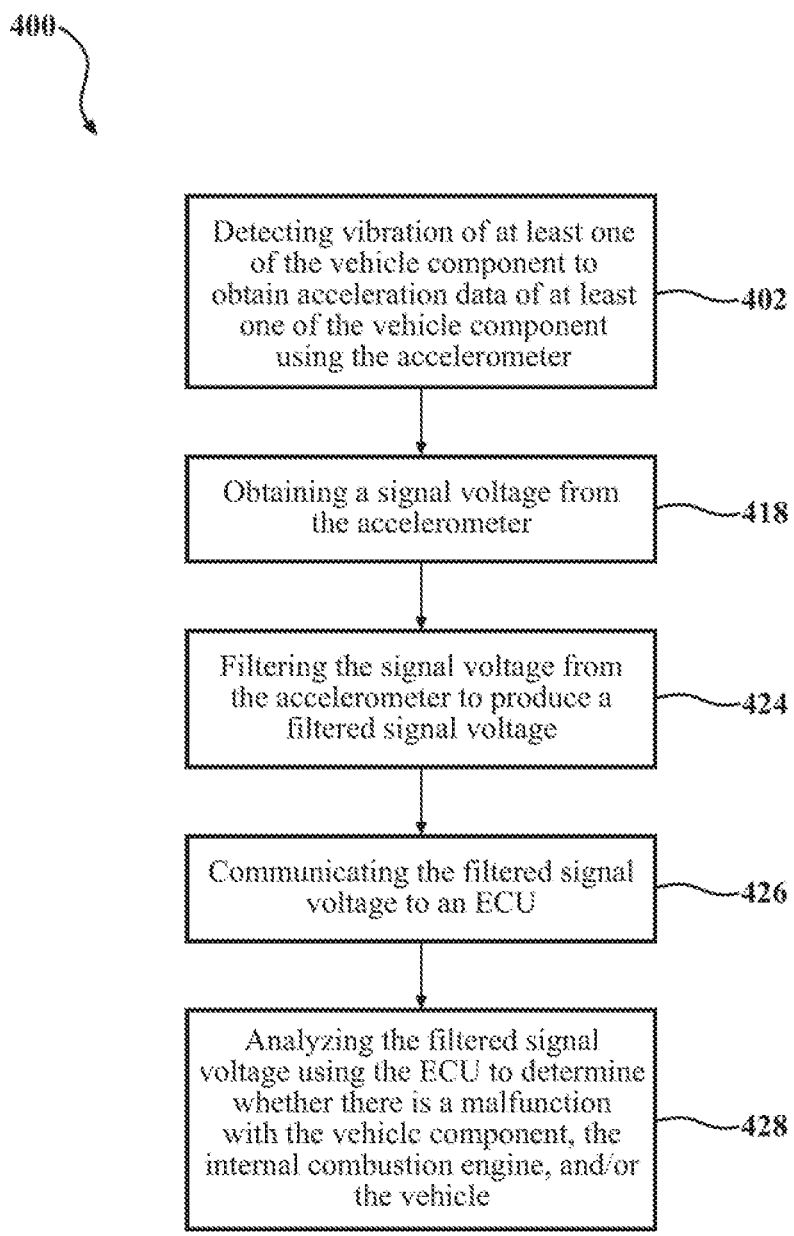
FIG. 31 is a flowchart of the method of FIG. 26, further comprising the steps of obtaining a signal voltage from the accelerometer, filtering the signal voltage from the accelerometer to produce a filtered signal voltage, and communicating the filtered signal voltage to an ECU, with the step of analyzing the acceleration data to perform diagnostics being further defined as analyzing the filtered signal voltage using the ECU to determine whether there is a malfunction with the vehicle component, the internal combustion engine, and/or the vehicle.

With reference to FIG. 31, the method 400 of analyzing acceleration data of the vehicle component 82 to perform diagnostics of one of the vehicle component 82, the internal combustion engine 31, and the vehicle 33 may further comprise the steps of obtaining a signal voltage from the accelerometer 88, as indicated by block 418, filtering the signal voltage from the accelerometer 88 to produce a filtered signal voltage, as indicated by block 424, and communicating the filtered signal voltage to the ECU 64, as indicated by block 426. In this embodiment, the step 404 of analyzing the acceleration data to perform diagnostics is further defined as analyzing the filtered signal voltage using the ECU 64 to determine whether there is a malfunction with the vehicle component 82, the internal combustion engine 31, and/or the vehicle 33, as indicated by block 428. In this embodiment, the step 424 of filtering the signal voltage may be completed using the accelerometer 88 or the microprocessor 63. Filtering the signal voltage to produce the filtered signal voltage and communicating the filtered signal voltage to the ECU 64 allows the ECU 64 to determine whether there is a malfunction with the vehicle component 82, the internal combustion engine 31, and/or the vehicle 33 without the need to first filter the signal voltage using the ECU 64.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for receiving exhaust gas from an internal combustion engine of a vehicle and for delivering compressed air to the internal combustion engine, said turbocharger comprising:
   a turbine housing defining a turbine housing interior;
   a turbine wheel disposed within said turbine housing interior for receiving the exhaust gas from the internal combustion engine;
   a turbocharger shaft coupled to and rotatable by said turbine wheel;
   a compressor housing defining a compressor housing interior;
   a compressor wheel disposed within said compressor housing interior and coupled to said turbocharger shaft, with said compressor wheel being rotatable by said turbocharger shaft for delivering compressed air to the internal combustion engine;
   a bearing housing coupled to and disposed between said turbine housing and said compressor housing, with said bearing housing defining a bearing housing interior, and with said turbocharger shaft disposed within said bearing housing interior; and
   an electronic actuator assembly comprising,
      an actuator housing coupled to at least one of said turbine housing, said compressor housing, and said bearing housing, and
      an accelerometer coupled to said actuator housing;
   wherein said accelerometer is adapted to detect vibration of at least one of said turbine housing, said compressor housing, said bearing housing, and said actuator housing thereby obtaining acceleration data of at least one of said turbine housing, said compressor housing, said bearing housing, and said actuator housing to determine rotational speed of said turbocharger shaft;
   wherein said electronic actuator assembly further comprises a microprocessor, with said microprocessor adapted to receive the acceleration data from said accelerometer to calculate rotational speed of said turbocharger shaft;
   wherein said microprocessor is adapted to be connected with an electronic control unit (ECU), with said microprocessor adapted to provide an output signal containing said acceleration data to the ECU to determine rotational speed of said turbocharger shaft; and
   wherein said microprocessor is adapted to provide said output signal to the ECU over a Controller Area Network (CAN).

2. The turbocharger as set forth in claim 1, further comprising a printed circuit board (PCB), wherein said actuator housing defines an actuator housing interior with said PCB being disposed within said actuator housing interior, and wherein said accelerometer is disposed on said PCB.

3. The turbocharger as set forth in claim 1, free of a speed sensor for determining the rotational speed of said turbocharger shaft.

4. The turbocharger as set forth in claim 1, wherein said accelerometer is a three-axis accelerometer.

5. A method of analyzing acceleration data of a turbocharger of an internal combustion engine of a vehicle to perform diagnostics of one of the turbocharger, the internal combustion engine, and the vehicle, with the turbocharger including a turbine housing defining a turbine housing interior, a turbine wheel disposed within the turbine housing interior for receiving the exhaust gas from the internal combustion engine, a turbocharger shaft coupled to and rotatable by the turbine wheel, a compressor housing defining a compressor housing interior, a compressor wheel disposed within the compressor housing interior and coupled to the turbocharger shaft and being rotatable by the turbocharger shaft for delivering compressed air to the internal combustion engine, a bearing housing coupled to and disposed between the turbine housing and the compressor housing with the bearing housing defining a bearing housing interior and with the turbocharger shaft disposed within the bearing housing interior, and an electronic actuator assembly including an actuator housing coupled to one of the turbine housing, the compressor housing, and the bearing housing, and an accelerometer coupled to the actuator housing, said method comprising the steps of:
   detecting vibration of at least one of the turbine housing, the compressor housing, the bearing housing, and the actuator housing to obtain acceleration data of at least one of the turbine housing, the compressor housing, the bearing housing, and the actuator housing using the accelerometer; and
   analyzing the acceleration data to perform diagnostics of at least one of the turbocharger, the internal combustion engine, and the vehicle;
   determining standard acceleration data;
   communicating the acceleration data to an electronic control unit (ECU); and further comprising the step of communicating the acceleration data to the ECU over a Controller Area Network (CAN).

6. The method as set forth in claim 5, further comprising the step of determining standard acceleration data, and wherein the step analyzing the acceleration data to perform diagnostics is further defined as comparing the acceleration data to the standard acceleration data to determine whether there is a malfunction with the turbocharger, the internal combustion engine, and/or the vehicle.

7. The method as set forth in claim 5, wherein the step of analyzing the acceleration data to perform diagnostics is further defined as:
filtering the acceleration data obtained by the accelerometer to produce filtered acceleration data to send to the ECU over the CAN; and
comparing the filtered acceleration data to the standard acceleration data to determine whether there is a malfunction with the turbocharger, the internal combustion engine, and/or the vehicle.

8. A method of analyzing acceleration data of a turbocharger of an internal combustion engine of a vehicle to perform diagnostics of one of the turbocharger, the internal combustion engine, and the vehicle, with the turbocharger including a turbine housing defining a turbine housing interior, a turbine wheel disposed within the turbine housing interior for receiving the exhaust gas from the internal combustion engine, a turbocharger shaft coupled to and rotatable by the turbine wheel, a compressor housing defining a compressor housing interior, a compressor wheel disposed within the compressor housing interior and coupled to the turbocharger shaft and being rotatable by the turbocharger shaft for delivering compressed air to the internal combustion engine, a bearing housing coupled to and disposed between the turbine housing and the compressor housing with the bearing housing defining a bearing housing interior and with the turbocharger shaft disposed within the bearing housing interior, and an electronic actuator assembly including an actuator housing coupled to one of the turbine housing, the compressor housing, and the bearing housing, and an accelerometer coupled to the actuator housing, said method comprising the steps of:
detecting vibration of at least one of the turbine housing, the compressor housing, the bearing housing, and the actuator housing to obtain acceleration data of at least one of the turbine housing, the compressor housing, the bearing housing, and the actuator housing using the accelerometer; and
analyzing the acceleration data to perform diagnostics of at least one of the turbocharger, the internal combustion engine, and the vehicle; further comprising the steps of:
obtaining a signal voltage from the accelerometer; and
communicating the signal voltage to an electronic control unit (ECU);
wherein the step of analyzing the acceleration data to perform diagnostics is further defined as analyzing the signal voltage using the ECU to determine whether there is a malfunction with the turbocharger, the internal combustion engine, and/or the vehicle.

9. The method as set forth in claim 5, further comprising the steps of:
obtaining a signal voltage from the accelerometer;
filtering the signal voltage from the accelerometer to produce a filtered signal voltage; and
communicating the filtered signal voltage to an electronic control unit (ECU);
wherein the step of analyzing the acceleration data to perform diagnostics is further defined as analyzing the filtered signal voltage using the ECU to determine whether there is a malfunction with the turbocharger, the internal combustion engine, and/or the vehicle.

10. The method as set forth in claim 5, further comprising the steps of:
determining a maximum acceleration threshold of the accelerometer allowed to remain within a warranty of the turbocharger; and
storing the maximum acceleration threshold within memory of the accelerometer;
wherein the step of analyzing the acceleration data to perform diagnostics is further defined as:
comparing the acceleration data obtained by the accelerometer to the maximum acceleration threshold; and
voiding the warranty of the turbocharger if the acceleration data obtained by the accelerometer is greater than the maximum acceleration threshold.

11. The method as set forth in claim 5, further comprising the steps of:
determining a predetermined acceleration threshold of the accelerometer; and
storing acceleration data within memory of the accelerometer that exceeds the predetermined acceleration threshold,
wherein the step of analyzing the acceleration data to perform diagnostics is further defined as analyzing the acceleration data stored within the memory of the accelerometer to determine predetermined events of the turbocharger.

12. The method as set forth in claim 5, wherein the step of analyzing the acceleration data to perform diagnostics is further defined as determining predetermined time increments to sample the acceleration data from the accelerometer and further comprising the step of:
storing the acceleration data taken at the predetermined time increments to store a histogram of the acceleration data taken during use of the electronic actuator assembly.

13. The method as set forth in claim 5, wherein the step of analyzing the acceleration data to perform diagnostics is further defined as determining rotational speed of the turbocharger shaft from the acceleration data obtained by the accelerometer by calculating rotational speed of the turbocharger shaft from the acceleration data using the accelerometer.

14. The method as set forth in claim 6, further comprising the steps of:
determining standard acceleration data; and
communicating the acceleration data to an electronic control unit (ECU).

15. The turbocharger as set forth in claim 2, free of a speed sensor for determining the rotational speed of said turbocharger shaft.

* * * * *